(12) United States Patent
Riocreux et al.

(10) Patent No.: US 9,477,623 B2
(45) Date of Patent: *Oct. 25, 2016

(54) BARRIER TRANSACTIONS IN INTERCONNECTS

(71) Applicant: ARM LIMITED, Cambridge (GB)

(72) Inventors: Peter Andrew Riocreux, Cheadle (GB); Bruce James Mathewson, Papworth Everand (GB); Christopher William Laycock, Sheffield (GB); Richard Roy Grisenthwaite, Guilden Morden (GB)

(73) Assignee: ARM Limited, Cambridge (GB)

( * ) Notice: Subject to any disclaimer, the term of this patent is extended or adjusted under 35 U.S.C. 154(b) by 581 days.

This patent is subject to a terminal disclaimer.

(21) Appl. No.: 13/960,128

(22) Filed: Aug. 6, 2013

(65) Prior Publication Data

US 2014/0040516 A1    Feb. 6, 2014

Related U.S. Application Data

(63) Continuation of application No. 12/923,727, filed on Oct. 5, 2010, now Pat. No. 8,607,006.

(30) Foreign Application Priority Data

Oct. 13, 2009 (GB) .................................. 0917946.6
Apr. 30, 2010 (GB) .................................. 1007342.7

(51) Int. Cl.
*G06F 13/16* (2006.01)
*G06F 13/362* (2006.01)
*G06F 13/364* (2006.01)

(52) U.S. Cl.
CPC ......... *G06F 13/362* (2013.01); *G06F 13/1621* (2013.01); *G06F 13/1689* (2013.01); *G06F 13/364* (2013.01)

(58) Field of Classification Search
CPC ........................ G06F 13/1621; G06F 13/1626
See application file for complete search history.

(56) References Cited

U.S. PATENT DOCUMENTS 4,833,468 A    5/1989    Larson et al.
5,224,214 A    6/1993    Rosich
(Continued)

FOREIGN PATENT DOCUMENTS

EP    1 594 061    11/2005
EP    2 015 167    1/2009
(Continued)

OTHER PUBLICATIONS

UK Examination Report dated Dec. 12, 2013 in GB 1007342.7.
(Continued)

*Primary Examiner* — Brian Misiura
(74) *Attorney, Agent, or Firm* — Nixon & Vanderhye P.C.

(57) ABSTRACT

Interconnect circuitry is configured to provide data routes via which at least one initiator device may access at least one recipient device. The circuitry including: at least one input for receiving transaction requests from at least one initiator device; at least one output for outputting transaction requests to the at least one recipient device; and at least one path for transmitting transaction requests between at least one input and at least one output. Also includes is control circuitry for routing the received transaction requests from at least one input to at least one output and responds to a barrier transaction request to maintain an ordering of at least some transaction requests with respect to said barrier transaction request within a stream of transaction requests passing along one of said at least one paths. Barrier transaction requests include an indicator of transaction requests whose ordering is to be maintained.

22 Claims, 18 Drawing Sheets

(56) References Cited

U.S. PATENT DOCUMENTS

| | | |
|---|---|---|
| 5,274,782 A | 12/1993 | Chalasani et al. |
| 5,459,842 A | 10/1995 | Begun et al. |
| 5,608,870 A | 3/1997 | Valiant |
| 5,675,579 A | 10/1997 | Watson et al. |
| 6,038,646 A | 3/2000 | Sproull |
| 6,748,518 B1 | 6/2004 | Guthrie et al. |
| 6,967,926 B1 | 11/2005 | Williams et al. |
| 7,031,338 B2 | 4/2006 | Weaver |
| 7,042,448 B2 | 5/2006 | Kunimatsu et al. |
| 7,500,045 B2 | 3/2009 | Hofmann et al. |
| 7,526,593 B2 | 4/2009 | Mandal et al. |
| 7,603,490 B2 | 10/2009 | Biran et al. |
| 7,610,458 B2 | 10/2009 | Arimilli et al. |
| 7,917,676 B2* | 3/2011 | Sullivan, Jr. ............ G06F 9/52 710/107 |
| 7,984,202 B2 | 7/2011 | Hofmann et al. |
| 8,352,682 B2* | 1/2013 | Speier ............... G06F 12/0811 711/122 |
| 8,463,966 B2* | 6/2013 | Riocreux ........... G06F 13/1621 710/107 |
| 8,589,638 B2* | 11/2013 | Campbell ............ G06F 9/522 711/155 |
| 8,601,167 B2* | 12/2013 | Riocreux ........... G06F 13/1621 710/1 |
| 8,612,950 B2* | 12/2013 | Shpeisman ............ G06F 8/443 717/151 |
| 8,732,400 B2* | 5/2014 | Riocreux ........... G06F 13/1621 711/100 |
| 8,856,408 B2* | 10/2014 | Riocreux ........... G06F 13/1621 710/36 |
| 9,026,744 B2* | 5/2015 | Hofmann ............ G06F 13/1621 711/147 |
| 2003/0110340 A1 | 6/2003 | Butler et al. |
| 2006/0218335 A1 | 9/2006 | Hofmann et al. |
| 2007/0250668 A1 | 10/2007 | Arimilli et al. |
| 2008/0168191 A1 | 7/2008 | Biran et al. |
| 2008/0301342 A1 | 12/2008 | Hofmann et al. |

FOREIGN PATENT DOCUMENTS

| | | |
|---|---|---|
| JP | 2002-510079 | 4/2002 |
| JP | 2006-178866 | 7/2006 |
| JP | 2008-503808 | 2/2008 |
| JP | 2008-535068 | 8/2008 |
| JP | 2010-530571 | 9/2010 |
| TW | 200502805 | 1/2005 |
| TW | 200849051 | 12/2008 |
| WO | WO 99/38085 | 7/1999 |
| WO | WO 2006/102667 | 9/2006 |
| WO | WO 2008/151101 | 12/2008 |
| WO | WO 2009/025104 | 2/2009 |

OTHER PUBLICATIONS

Japanese Office Action mailed Dec. 20, 2013 in JP2012-533684 and English translation.
English translation of Japanese Office Action mailed Jan. 7, 2014 in JP2012-533685.
English translation of Japanese Decision of Rejection mailed May 13, 2014 in JP 2012-533684.
Chinese Office Action issued Aug. 4, 2014 and English translation in CN 201080046421.8, 29 pages.
Taiwan Notice of Allowance and Search Report dated Nov. 12, 2014 in TW 99133596 and English translation, 6 pages.
Israeli Office Action issued Aug. 10, 2015 in corresponding IL application and partial English translation, 3 pages.
Notice of Allowance mailed Aug. 14, 2013 in co-pending U.S. Appl. No. 12/923,727.
P.E. McKenney, "Memory Barriers: a Hardware View for Software Hackers" Apr. 5, 2009, pp. 1-26.
ARM Limited, "ARM Cortex-M Programming Guide to Memory Barrier Instructions, Application Note 321" Sep. 17, 2012, pp. 1-52.
Oracle, "Handing Memory Ordering in Multithreaded Applications with Oracle Solaris Studio 12" Oracle White Paper, Sep. 2010, 8 pages.
U.S. Appl. No. 12/923,723, filed Oct. 5, 2010, Riocreux et al.
Search Report for UK 0917946.6 dated Jan. 22, 2010.
Search Report for UK 1007342.7 dated Aug. 20, 2010.
International Search Report and Written Opinion of the International Searching Authority mailed Dec. 6, 2010 in PCT/GB2010/001819.
Search Report for UK 1007363.3 dated Aug. 23, 2010.
International Search Report and The Written Opinion of the International Searching Authority mailed Apr. 18, 2011 in PCT/GB2010/001822.
Office Action mailed Dec. 6, 2012 in co-pending U.S. Appl. No. 12/923,723.
Office Action mailed Jun. 17, 2013 in co-pending U.S. Appl. No. 12/923,723.
Chinese Office Action issued May 5, 2014 and English translation in CN 201080046966.9, 22 pages.
UK Examination Report dated Apr. 1, 2016 issued in GB 1007363.3, 5 pages.

* cited by examiner

| Type | Response required | Replicates at splits | Requires address | Blocked upstream | Must block at CC split | Must block at RC split | Usage |
|---|---|---|---|---|---|---|---|
| DSB | Yes | Yes | No | Yes | No | No | DSB instruction. Cannot be converted to any other type. |
| DMB global flush | Yes | Yes | No | Yes | No | No | Intentionally blocking DMB instruction. Can be converted to any other DMB type in some circumstances. |
| DMB local flush | Yes | Yes | No | Yes | No | No | Non-blocking DMB that is blocked for structural reasons. Can be converted to any other DMB type in some circumstances. |
| DMB order | No | Yes | No | No | Yes (inside shareability domain) | Yes | Intentionally non-blocking DMB instruction. Can be converted to any other DMB type in some circumstances. |
| Autorejuvenating read/write separator | No | Yes | No | No | Recreated | Recreated | To preserve strict ordering; to prevent hazards where no hazard detection is performed |
| Early unblock flow | No | No | No | No | Yes until only one response outstanding | Yes until only one response outstanding | To prevent premature early unblocking of the last path in a CC region |
| Addressed, order barrier | No | No | Yes | No | No | No | To prevent hazards; for detailed cache maintenance |
| Addressed flush barrier | Yes | No | Yes | Yes | No | No | Supporting looping topologies |

FIG. 20

BARRIER TRANSACTIONS IN INTERCONNECTS

This application is a Continuation of U.S. patent application Ser. No. 12/923,727, filed Oct. 5, 2010, which claims priority to GB Application No. 0917946.6 filed 13 Oct. 2009 and GB Application No. 1007342.7 filed 30 Apr. 2010, the entire contents of which are hereby incorporated by reference in this application.

BACKGROUND OF THE INVENTION

1. Field of the Invention

This invention relates to the field of data processing systems. More particularly the invention relates to interconnect circuitry for data processing apparatus, the interconnect circuitry providing data routes via which one or more initiator devices such as a master may access one or more recipient devices such as a slave.

2. Description of the Prior Art

Interconnects are used to provide connections between different components in data processing systems. They provide data routes via which one or more initiator devices may access one or more recipient device. An initiator device is simply a device that generates a transaction request, and therefore may be a master such as a processor or it may be another interconnect. A recipient device is simply a device that receives the transactions and it may be a slave such as a peripheral or it may also be another interconnect.

As systems become more complex with multiple processors communicating with each other and multiple devices, authors writing software for multiprocessor systems need detailed knowledge of the topology and latency of an architecture, in order to write software which ensures consistent behaviour of interacting processes across time. Even with this detailed knowledge this consistency is only achieved with some non-trivial effort and cost to performance.

It would be desirable to provide mechanisms that allowed a programmer to ensure consistent behaviour of interacting processes across time in a generic manner for an arbitrary architecture.

SUMMARY OF THE INVENTION

A first aspect of the invention provides interconnect circuitry for a data processing apparatus, said interconnect circuitry being configured to provide data routes via which at least one initiator device may access at least one recipient device, said interconnect circuitry comprising: at least one input for receiving transaction requests from said at least one initiator device; at least one output for outputting transaction requests to said at least one recipient device; at least one path for transmitting said transaction requests between said at least one input and said at least one output; control circuitry for routing said received transaction requests from said at least one input to said at least one output; wherein said control circuitry is configured to respond to a barrier transaction request to maintain an ordering of at least some transaction requests with respect to said barrier transaction request within a stream of transaction requests passing along one of said at least one paths, by not allowing reordering of at least some transactions requests that occur before said barrier transaction request in said stream of transaction requests with respect to at least some transaction requests that occur after said barrier transaction request in said stream of transaction requests; wherein said barrier transaction request comprising an indicator indicating which of said transaction requests within said stream of transaction requests comprise said at least some transaction requests whose ordering is to be maintained.

As systems get more complicated with multiple processors and multiple peripherals it is difficult for a programmer to keep the required relative ordering of transactions without a detailed knowledge of the architecture of the system the program will be executed on. Providing interconnect circuitry that is responsive to barrier transactions provides software authors with a way of ensuring consistency of behaviour independent of the architecture and topology of the system that they are writing the software for.

In particular, providing interconnect circuitry with control circuitry configured to respond to barrier transaction requests to maintain an ordering of at least some of the requests with respect to the barriers means that the author can write software that can operate on the system when he only knows the logical relationship between the producers and consumers of data and not the topologies and latencies of the system they are operating in. In this way the interconnect circuitry allows a programmer to keep relative ordering of transactions regardless of architecture.

A barrier transaction is a transaction that has a property that transactions that it controls must not be reordered with respect to it. Thus, it can be inserted into a stream of transaction requests to maintain the order of the transactions it controls and thereby prevent some transactions being performed before others. By providing an indicator within the barrier transaction that indicates which of the transaction requests in the stream of transaction requests the barrier controls, more precise control of the system can be provided so that the latency increase due to the barriers are limited to a subset of the transactions which comprises those that need to be delayed, other transactions being allowed to proceed as usual.

Without barriers, authors must have detailed knowledge of the architectural relationships of agents in the system; with barriers they need only know the logical relationships between producers and consumers of data. These relationships do not change if the software is run on a different architecture and therefore use of barriers permits authors to create software that works consistently on all platforms and therefore makes software systems easier to port between platforms.

In effect barriers allow the hardware and software design to be decoupled thereby making third-party software easier to deploy.

In some embodiments the control circuitry maintains the ordering by delaying transmission along said path of said at least some transaction requests that occur subsequent to said barrier transaction request in said stream of transaction requests until receipt of a response signal clearing said barrier transaction.

In general the control circuitry does not allow barrier transaction requests to overtake those at least some transaction requests whose ordering is to be maintained and which are in front of the barrier in the transaction stream. In some "non-blocking" barriers the barrier acts to keep the ordering by also not allowing transaction requests behind the barrier from overtaking it. In a system where the at least some transaction requests that are to be kept behind the barrier have been delayed perhaps by blocking circuitry then transaction requests that are behind the barrier can be allowed to overtake it as these are not the transaction requests that are to have their order maintained by the barrier as these transaction requests have already been delayed upstream. However, all transaction requests in front of the barrier must remain in front of it, as otherwise when the delayed transaction requests are allowed to proceed in response to a response signal indicating the barrier has arrived at a response signal generator, then this should indicate that all transaction requests in front of it in the transaction stream have also reached this point.

In some embodiments the barrier transactions will have similar properties to the other transaction requests that the interconnect deals with and thus, the interconnect can provide this additional function while being similar in other ways to a more conventional interconnect.

It should be noted that an initiator device is any device that is upstream of the interconnect and supplies transaction requests. Thus, it could for example, be another interconnect or it could be a master. Similarly a recipient device is a device downstream of the interconnect that receives the transaction requests, thus, it could for example be a slave or it could be another interconnect.

In some embodiments said indicator is indicative of a property of said transaction requests, and said at least some transaction requests comprise transaction requests having said property.

One way of indicating which transaction requests should be controlled by the barrier, is to indicate a property of these requests. In this way any transaction request having this property can be identified and treated accordingly. In many cases it may be only transaction requests with certain properties that need to be controlled, as it is only these transaction requests that may cause the system to operate incorrectly.

In some embodiments said property comprises a source of said transaction request.

The barriers may also be specific to particular initiator devices and this can be useful where a master generates transactions that it is important are ordered with respect to each other but not with respect to other transactions generated elsewhere. Allowing the barrier to only delay transactions from particular initiator devices helps reduce latency introduced by the barriers as it reduces the number of transaction that are delayed by the barriers.

In some embodiments said indicator indicates a function of said transaction request.

Some interconnects may be configured so that barriers can be used to delay transaction requests having a predetermined function and not delay other transaction requests. Thus, they may for example, delay writes to memory but not the reads.

In some embodiments said indicator indicates one or more addresses, said at least some transaction requests comprising transaction requests to said one or more addresses.

As the barrier transactions are designed to have a similar format to other transactions transmitted by the interconnect, they have an address field, and thus, one convenient and effective way of limiting the impact of the barriers is to limit them to controlling transactions to one or more addresses. Thus, only transactions to these addresses are controlled by the barrier. This can be useful, where it is important that two or more transactions to the same address or range of addresses are not reordered with respect to each other. A range of addresses may be represented in the barrier by using a base address in the address field of the barrier transaction and providing a further field giving an indication of the range size.

A further advantage of addressed barrier transactions is that they do not need to be duplicated at every divergent node as they only control transaction requests to certain destinations and thus, they only need to be sent along paths to these addressed destinations. Thus, they can be used where the topology of the interconnect is such that there are many nodes and barrier storms can be created with many duplicated barriers. Having addressed barriers avoids this problem.

An addressed barrier transaction can be used to block all subsequent transactions or in some embodiments to block transactions to the specified address or address ranges and not allow these transactions further until a response to the barrier is received. In other embodiments it can be used in a non-blocking way. Provided the barrier transaction is sent to each destination potentially having such an address, then in some embodiments subsequent transaction requests are not delayed until a response to the barrier has been received, the barrier simply sits in the required transaction streams and does not allow any transactions subsequent to it overtake it. In this way it provides the required control without increasing latency by very much.

Addressed barriers may also be useful in systems having a hazard unit. A hazard unit is used to track transactions that are pending and that are potentially hazarding in that they may affect later transactions. For example a store transaction storing data to a particular address will affect a read to that address, and thus, any reads to that address occurring subsequent to the store in the transaction stream need to stay behind it. A hazard unit tracks the potentially hazarding transaction and any later transaction that it may be a hazard for, until it has detected that the hazarding transaction has completed. It is desirable for hazard units to be small, however, if they are full, then no further transaction can be issued by the initiator until a hazarding transaction has completed and the relevant transaction requests have been deleted from the hazard unit. Stalling the system in this way increases latency, and one way of addressing this is with the use of barriers. A barrier ensures the ordering of certain transactions is maintained. However, they can themselves introduce latency. An addressed barrier is a good solution, in that if a barrier is generated to an address of one of the recently stored hazarding transactions, then no subsequent transaction can overtake this hazarding transaction and it is therefore no longer a hazard and can be removed from the hazard unit.

In some embodiments, said interconnect circuitry comprises a plurality of domains, each domain comprising at least one input from an initiator device, and said barrier transaction request comprises a domain indicator indicating whether said barrier should delay transaction requests received from all initiator devices, or only from initiator devices from one of said domains or no transaction requests.

A further way of delimiting the functionality of the barrier is to limit it with respect to particular domains. Domains receive signals from particular initiator devices and barriers have indicators associated with them indicating whether they should delay transactions from all initiator devices or only from initiator devices relating to a particular domain or to no transaction requests. If the domains are set up in a suitable manner then this can provide a convenient way of limiting barrier transaction behaviour and reducing latency while maintaining required functionality.

In some embodiments, said interconnect circuitry further comprises barrier management circuitry.

In addition to the control circuitry for controlling the transaction request with respect to the barrier transactions, there may also be barrier management circuitry that manages the barrier transaction and cancels or combines them as appropriate.

The transmission of barrier transaction requests and their duplication and the processing of their subsequent responses is not without overhead, and thus, if there are neighbouring barrier transaction requests it is advantageous if they are merged to form a single barrier transaction request which can control the ordering of the surrounding transaction requests as required. In this way only the one merged request need be responded to, duplicated etc.

In some embodiments, said control circuitry is configured to duplicate barrier transactions at a divergent node at an entry to a reconvergent region and to provide said duplicated barrier transactions with a reconvergent indicator; and said barrier management circuitry is responsive to detecting said duplicated barrier transactions exiting said reconvergent region to remove said reconvergent indicator and to merge at least some of said duplicated barrier transactions.

Where there is a divergent node where a single entry path becomes several exit paths, in order for the barrier transactions to function correctly, they must be duplicated on these exit paths. This allows the ordering of the relevant transactions to be maintained with respect to the barrier transactions on each of the paths. If the divergent paths are an entry to a re-convergent region then at least some of these paths will later merge. This could result in all the duplicated barriers being sent down these merged paths. Thus, in some embodiments of the present invention not only are the barrier transactions duplicated but they are provided with a re-convergent indicator. This enables barrier management circuitry to detect the duplicated barrier transactions exiting the reconvergent region and to realise that they are related to the other duplicated barrier transactions and to merge at least some of them as appropriate. The reconvergent indicator should also be removed at the edge of the reconvergent region and the barriers will from then on be treated independently.

It should be noted that if transaction requests to a particular address always cross a reconvergent region by the same path then the region is not functionally reconvergent as far as that address is concerned, If this is the case for all addresses then the region is not reconvergent for any address and can be treated as a cross coupled region. There are advantages to having no reconvergent regions and thus, in some embodiments interconnects are designed so that regions are not reconvergent as far as addressed transactions are concerned and thus, although they may appear from the topology to be reconvergent, functionally they act as cross coupled regions.

In some embodiments, said control circuitry is further configured to provide said duplicated barrier with an indication of a number of said duplicated barrier transactions, to indicate to said barrier management circuitry a number of barrier transactions that can be merged.

The control circuitry may provide the duplicated barrier transactions with an indication of a number of said duplicated barrier transactions. This enables the barrier management circuit to know how many potential barrier transactions can be merged together and to collect these at the exit of the reconvergent region and merge them together as appropriate.

In some embodiments, said barrier management circuitry is configured to respond to detection of neighbouring barrier transaction requests in said stream of transaction requests having a same indicator to merge said neighbouring barrier transaction requests and to provide said merged barrier transaction request with said same indicator.

There are other occasions where barrier transaction requests can be removed from the system by merging them together. For example, neighbouring barrier transaction requests having a same indicator will have the same effect on the same transactions and thus, they could be merged into a single barrier transaction request.

In some embodiments, said barrier management circuitry is configured to merge barrier transaction requests with a different indicator and to provide said merged barrier transaction request with an indicator indicating transactions indicated by each of said indicators of said merged barrier transaction requests.

Furthermore, barrier transaction requests with different indicators may also be able to be merged provided a new indicator is given to the merged barrier transaction request that indicates that the transaction request controlled by each of the merged barrier transactions are to be controlled by the merged barrier transaction.

For example, where the barrier transaction requests have different domain indicators then a merged barrier transaction would have a domain indicator indicating the restrictions of the two combined domains. This indicator should encompass both of the domains indicated by the separate barrier transactions. Thus, if they are overlapping an indicator indicating the largest of the two domains would be appropriate.

In some embodiments, said barrier management circuitry is configured in response to detecting a barrier transaction request following a previous barrier transaction request with no intervening transaction requests that have their ordering controlled by said following barrier transaction request, to: reorder said transaction requests such that said following barrier transaction is moved adjacent to said previous barrier transaction request; and to merge said adjacent barrier transaction requests.

Similarly in other embodiments, said barrier management circuitry is configured in response to detecting a barrier transaction request following a previous barrier transaction request with no intervening transaction requests that have their ordering controlled by said previous barrier transaction request, to: reorder said transaction requests such that said previous barrier transaction is moved adjacent to said following barrier transaction request; and to merge said adjacent barrier trans action requests.

Where there are barrier transaction requests that have intervening transaction requests and none of the intervening transactions requests are controlled by the first barrier transaction request or none of them are controlled by the second barrier transaction request then the barrier transaction request that has no intervening requests that it controls can be moved with respect to these requests and thus, can be moved adjacent to the other barrier request and they can thereafter be merged. Furthermore, if none of the intervening transaction requests are controlled by either barrier then both barriers may be moved and the transactions therebetween may also be reordered and the adjacent barriers then merged. By merging barriers in this way, the overheads associated with transmitting barrier transaction requests and transmitting responses to them can be reduced.

In some embodiments, said barrier management circuitry is configured in response to detecting a barrier transaction between two or more transactions that are transactions that can be merged, to duplicate said barrier transaction and put one of said duplicated barrier transactions on either side of said two or more transactions and to merge said two or more transactions.

Transactions that could usually be merged but are separated by a barrier transaction, can be merged, provided the barrier transaction is duplicated on either side of the merged transaction. It should be noted that there could be other transactions lying between the two barriers in addition to the merged transaction.

In some embodiments, said barrier management circuitry is configured to detect said barrier transaction requests within a reorder buffer or at a node within said interconnect circuitry, said node comprising an entry node to a bisection path, said bisection path being an only communication path between said entry node and an exit node of said bisection path in said interconnect circuitry.

Management of the barrier transaction requests in this way can be performed either at an entry node to a bisection path or within a reorder buffer. At these points, one can be sure that these barrier transaction requests are not duplicated elsewhere and thus, they can be safely merged.

In some embodiments, said control circuitry is configured to mark transaction requests that are not subject to any barrier transactions, said at least some transaction requests not comprising said marked transaction requests.

It may be convenient to be able to mark transaction requests so that barrier transactions do not apply to them. This can be useful for compliance with legacy systems which did not have barriers and thus marking transactions from legacy components in this way allows them to operate as expected in a system that supports barriers. It may also be useful to mark some instructions in this way where it is clear they should not be delayed for example, where they have a high priority.

A second aspect of the present invention provides an initiator device for issuing transaction requests to a recipient device via an interconnect, comprising: a barrier transaction request generator for generating barrier transaction requests indicating to said interconnect that an ordering of at least some transaction requests within a stream of transaction requests passing through said interconnect should be maintained by not allowing reordering of at least some of said transaction requests that occur before said barrier transaction request in said stream of transaction requests with respect to at least some of said transaction requests that occur after said barrier transaction request; wherein said barrier transaction request generator is configured to provide said generated barrier transaction requests with an indicator indicating which of said transaction requests within said stream of transaction requests comprise said at least some transaction requests whose ordering is to be maintained.

In some embodiments said initiator device comprises a barrier transaction generator, said barrier transaction generator being configured in response to detection of output of a strongly ordered transaction request to generate and output a barrier transaction.

A strongly ordered transaction that is generated by an initiator device has the effect of stalling output of further transactions by the master, as a strongly ordered transaction may need to be performed in the order it occurs in the initial transaction stream and must not be reordered with respect to other transactions. This is the case in AXI systems for example as AXI allow re-ordering of transactions and also provide separate address write and address read channels. Thus, when output to an interconnect the initiator device generally stalls to avoid any potential reordering hazards. Embodiments of the present invention provide a way of ensuring safe operation of the initiator device without the need for it to stall by generating a barrier that is then sent behind the strongly ordered transaction. At this point subsequent transactions can be output safe in the knowledge that they cannot be reordered with respect to other transactions. Clearly a barrier has its own latency, however, owing to the early response generation and other barrier management tools, this latency is significantly less than the latency produced by stalling of the initiator.

In some embodiments said initiator device further comprises: a hazard unit for storing outstanding transaction requests that may generate a hazard; and an output for outputting said transaction requests to said interconnect; wherein said initiator device is configured in response to detecting said hazard unit being full such that output of further transaction requests is stalled, to generate and output a barrier transaction and to flush said hazard unit of at least one transaction request.

As noted previously hazard units within data processing apparatuses are designed to be small and thus, can store only a limited number of transaction requests. When they are full the device needs to stall until at least one of the stored transaction requests is evicted, whereupon it can continue processing safely. This clearly increases the systems latency. Embodiments of the current invention address this by providing a barrier transaction request generator within the device. This is responsive to detecting the hazard unit being full to issue a barrier and this allows the initiator to evict any stored transactions relating to that barrier from the hazard unit. This therefore allows the initiator to continue processing and removes the need for it to stall.

In some embodiments, said barrier transaction request is a global barrier transaction request relating to all transaction requests, and said initiator device is configured to flush said hazard unit of all transaction requests.

In some embodiments the barrier transaction request is a global barrier transaction request and thus, issuing of such a barrier means that all the transactions within the hazard unit will not be able to generate a hazard and the whole hazard until can be flushed.

In other embodiments, said barrier transaction relates to an address of one of said transaction requests that is stored in said hazard unit, and said hazard unit is configured to flush said stored transaction request from said hazard unit.

A global barrier transaction request has latency issues associated with it and thus it may be more advantageous to the performance of the system to output an addressed barrier transaction requests such that transaction requests travelling to that particular address are held up by the barrier but other transaction requests can proceed. The latency associated with such a barrier is much smaller than is associated with a global barrier. The drawback is that only the transaction request(s) in the hazard unit relating to this address can be deleted. However, this frees up at least one space and allows the initiator device to continue processing and to stop stalling until the hazard unit is again full.

In some embodiments, said barrier transaction relates to an address of one of said transaction requests that is recently stored in said hazard unit, and said hazard unit is configured to flush said recently stored transaction request from said hazard unit.

A third aspect of the present invention provides a data processing apparatus comprising at least one initiator device according to a second aspect of the present invention for issuing transaction requests, at least one recipient device for receiving said transaction requests and an interconnect according to a first aspect of the present invention for connecting said at least one initiator device to said at least one recipient device.

A fourth aspect of the present invention provides a recipient device for receiving transaction requests from an interconnect, said transaction requests comprising barrier transaction requests, said barrier transaction requests being for maintaining an order of at least some transaction requests within a stream of transaction requests by not allowing reordering of said at least some of said transaction requests that occur before said barrier transaction request in said stream of transaction requests with respect to at least some of said transaction requests that occur after said barrier transaction request, said barrier transaction requests comprising an indicator indicating said at least some transaction requests whose ordering is to be maintained, said recipient device comprising: a response signal generator, said response signal generator being responsive to said barrier transaction requests to generate and send a response to said barrier transaction request and being responsive to a predetermined indicator in said barrier transaction request to delay sending said response until said recipient has at least partially processed at least one of said transaction requests received before said barrier transaction request.

A recipient device is responsive to receipt of the barrier transaction request to generate and transmit a response signal. However, in some cases the nature of the barrier is such that the recipient device does not respond immediately but rather waits until some processing of previously received transactions has completed or at least partially completed. This may be advantageous in the case for example of a data synchronisation barrier transaction that requires not only that all transaction before it have reached their final destinations, but may require that their processing is complete. In such a case only sending a response once this is true allows the initiator device and interconnect to safely proceed with further transactions once the response is received.

A fifth aspect of the present invention provides a method for routing data from at least one initiator device to at least one recipient device via interconnect circuitry, said method comprising: receiving transaction requests from said at least one initiator device at least one input; transmitting said transaction requests along at least one of a plurality of paths towards at least one output; in response to receipt of a barrier transaction request: maintaining an ordering of at least some transaction requests with respect to said barrier transaction request within a stream of transaction requests passing along one of said paths said bather transaction request, by not allowing reordering of at least some transactions requests that occur before said barrier transaction request in said stream of transaction requests with respect to at least some transaction requests that occur after said barrier transaction request in said stream of transaction requests; wherein said barrier transaction comprises an indicator indicating which of said transaction requests within said stream of transaction requests comprise said at least some transaction requests whose ordering is to be maintained.

The above, and other objects, features and advantages of this invention will be apparent from the following detailed description of illustrative embodiments which is to be read in connection with the accompanying drawings.

BRIEF DESCRIPTION OF THE DRAWINGS

FIG. 20 shows a summary of the different sorts of barrier transactions and how they can be converted from one type to another as they enter different regions of the interconnect that have different requirements.

DESCRIPTION OF THE PREFERRED EMBODIMENTS

Figure 1:
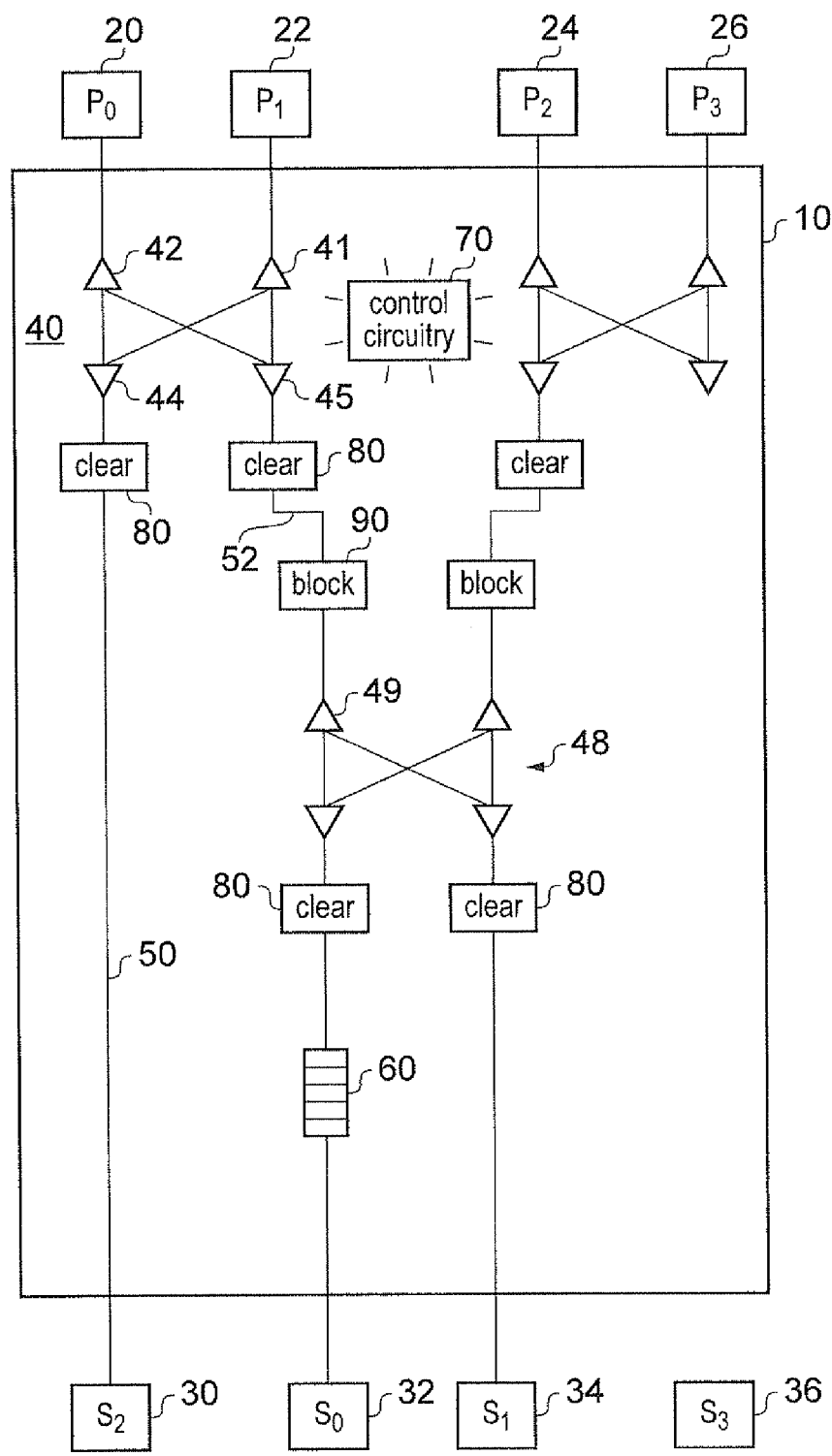
FIG. 1 shows an interconnect according to an embodiment of the present invention.

FIG. 1 shows an interconnect 10 according to an embodiment of the present invention. Interconnect 10 connects a plurality of masters 20, 22, 24 and 26 to a plurality of slaves 30, 32, 34 and 36 via a plurality of paths. These paths may have cross-coupled portions such as is shown for example at 40 where two paths each split into two at respective split points 41 and 42 and merge at merge points 44 and 45. There may also be bisection paths such as is shown for example at 50 These are paths that are the only connection between two nodes in the interconnect, such that cutting the path will in effect divide the interconnect in two.

When transactions pass along these different paths the nature of the paths, that is to say whether they are cross-coupled or bisection will affect the ordering of the transactions. A cross-coupled path for example will start with a split point that will divide the transaction stream into multiple transaction streams, and a transaction that was behind another transaction in the transaction stream before the split point may arrive at its destination before the transaction that it was previously behind arrives at its own destination. Transactions travelling along a bisection path must keep their order unless there is some functional unit that allows reordering such as a re-order buffer as is shown for example at 60. Re-order buffers are used for re-ordering transactions to allow transactions of a higher priority to be delivered to the slave before transactions of a lower priority.

There are also paths that are termed reconvergent wherein paths that are previously split come back together and this can also cause re-ordering within the transaction stream. Interconnect 10 does not have any reconvergent paths.

The fact that transactions can arrive at their destinations in a different order to the order that they were sent in can lead to problems where a subsequent transaction is dependent on a previous transaction and thus, needs it to complete first. For example, if there is a store instruction ahead of a load instruction to a same address in a transaction stream, then it is important that the store is performed before the load, or the load will read an incorrect value. In order to allow a programmer to ensure that the required transactions arrive in the required order, interconnect 10 is configured to respond to barrier transactions within the transaction stream to maintain ordering of transactions within the interconnect with respect to the barrier. Thus, a barrier transaction can be inserted between transactions which should not overtake each other and this will ensure that this does not occur.

The interconnect may respond to these barrier transactions by delaying the transactions that occur in the transaction stream subsequent to the barrier transaction from progressing through the interconnect until a response signal to the barrier transaction has been received. The response signal indicates that it is safe to send a subsequent instruction. It should be noted that a response signal that clears a path might be a signal indicating that the earlier transactions have all completed, or it may simply be a signal indicating that the barrier transaction has passed along a path, if for example the path is a bisection path, or that the barrier has reached a node where an early clearing response signal is sent and blocking is performed again.

The interconnect may also simply send the barrier transaction along the various paths behind the previous transactions so that when the barrier is detected as reaching a certain point the interconnect can be sure that all the previous transactions have already passed through this point. Whether it simply transmits the barrier within the stream, or delays the transactions depends on the nature of the barrier and whether it is a blocking barrier or not.

A blocking barrier is a barrier where the transactions behind it in the transaction stream that it controls have been blocked somewhere upstream, and thus, other transactions may overtake a blocking barrier as they are necessarily not those that need to stay behind it, however, the barrier itself cannot overtake any transaction requests in front of it that it controls. A blocking barrier can be unblocked by an early response unit. This is described in more detail below.

A non-blocking barrier is a barrier where no transaction requests have been blocked and thus, transaction requests that it controls must stay on the correct side of this barrier transaction request. As there is no upstream blocking, it cannot be unblocked by an early response unit. As will become clear later the different nature of the barriers may be indicated by blocking or non-blocking indicators, alternatively a system may only support one type of barriers in which case indicators are not required. Alternatively one barrier may be the default barrier type and in this case only the other type of barrier is provided with an indicator. Alternatively there may be regions of the interconnect where all barriers act as blocking barriers and regions where they all act as non-blocking. In such a case the interconnect may be configured such that barriers carry no indicators but the interconnect will treat them in a certain way dependent on their location within the interconnect.

The progress of the barrier transactions is controlled by control circuitry 70. This is schematically shown as a single block in this figure, however in reality the control circuitry is distributed throughout the interconnect adjacent to the circuitry that it controls. Thus, at each split point for example there will be some control circuitry that ensures at least in some embodiments that when a barrier transaction is received it is duplicated and a duplicate barrier transaction is sent down each exit path from the split point. There may be other embodiments where the duplicated barrier is sent down all but one exit paths, and this will be described later. The control circuitry will be aware that the barrier transaction has been duplicated and thus, may require response signals from each duplicated barrier transaction before it can clear the paths for transmission of the transactions that are subsequent to the original barrier transaction and must remain subsequent to it.

In its simplest form a barrier transaction is issued by a master, for example master 20 and the master 20 then blocks all subsequent transactions until it has a response signal from the interconnect indicating that it can transmit the subsequent transactions. Alternatively the barrier may be issued by the control circuitry immediately on entry to the interconnect. The transactions before the barrier transaction and the barrier transaction are transmitted to the interconnect and control circuitry 70 controls the routing of these transactions. Thus, at split point 42 the barrier transaction is duplicated and it travels to merge points 44 and 45. At this point the transactions are entering bisection paths 50 and 52 and as transactions cannot change their position with respect to a barrier on these paths when the barrier transaction arrives at the start of one of these paths one knows that all the transactions previous to it are ahead of it and will remain ahead of it along that path. Thus, an early response signal can be sent by clearing units 80 and in response to receiving both of these signals the control circuitry at split point 42 sends the early response signal to master 20 which can then unblock the transactions subsequent to the barrier transaction that are controlled by it and transmit them into the interconnect.

By providing an early response unit 80, master 20 is blocked for a much shorter time than had it awaited the response from the slaves indicating that the barrier transactions had reached the slaves and in this way the latency introduced by the barrier transactions is reduced.

The barrier transaction that passes along path 50 exits the interconnect and arrives at slave 30 without travelling along any path other than bisection path 50 and thus, there is no need to block again in response to this barrier transaction as once the barrier has passed clearing unit 80 the transactions in front of it must remain there. However, the barrier transaction that is sent along path 52 reaches a further cross-coupled section 48 and in response to receipt of the barrier transaction at the split point 49 control circuitry 70 associated with this split point duplicates the barrier transaction, sends it down both exit paths and blocks the entry path behind it to transaction requests that occur subsequent to the barrier and that are controlled by it. Thus, these subsequent transactions are stalled in some embodiments by being held in a buffer within the blocking circuitry 90 until a response signal is received to all duplicated barrier transactions. Thus, the duplicated barrier transactions pass through the cross-coupled circuitry 40 and exit the cross-coupled circuitry to join further bisection links 52 and 50. As noted before, a bisection path retains transactions in order relative to the barrier and thus, an early response can be sent from the start of the bisection path by clearing units 80. Blocking circuitry 90 waits to receive a response to the barrier transaction from split point 49. Spilt point 49 duplicates the barrier transaction and sends two barrier transactions further one down each path. Split point 49 does not send a response back to blocking circuitry 90 until it has received a response from each of the two barrier transactions that it has transmitted. In response to this response, blocking circuitry 90 allows any subsequent transactions held in its buffer to be transmitted. As the clearing circuitry is on the last bisection path before exit to the interconnect there is no need for further blocking for some barrier types.

There is as noted previously a re-order buffer 60 on bisection path 52 and this buffer is configured to be responsive to the barriers and does not allow transactions controlled by the barriers to be re-ordered with respect to the barriers.

In the previous description it is assumed that a barrier is there to maintain all the transactions that are subsequent to it behind it. However, in some embodiments, as will be seen in more detail later, the barrier may only need to stop a subset of the subsequent transactions from overtaking it, perhaps those from a particular master or those with a particular function, such as write transactions. In such a case, the control circuitry 70 and blocking circuitry 90 will only delay this subset of transactions and will allow the others to proceed. Furthermore, at a split point if the transactions that are controlled by the barrier will never go down one of the paths, a duplicated barrier does not need to be sent down that path.

In this regard, barriers that are marked as being relevant to write transactions are naturally blocking to further writes, so that no further write is issued until a response is received. Because of this property, the barrier does not need to block reads until a response to the write has been received, prior to the response no further writes may be issued and thus, reads can be issued safely, once a response is received to the write barrier, further writes may be issued and at this point the barrier should be blocking to reads too.

Figure 2:
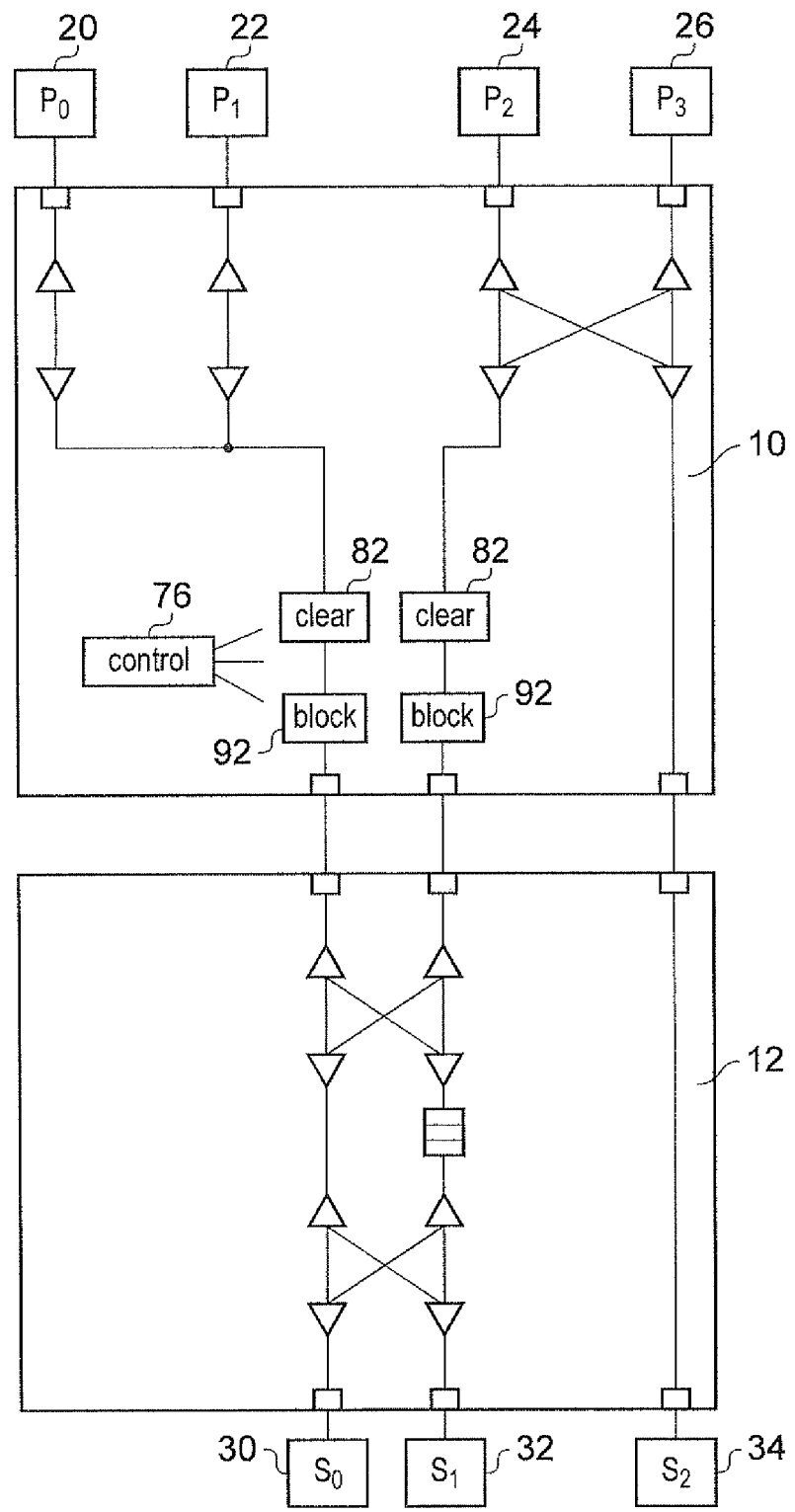
FIG. 2 shows two connected interconnects interconnect according to an embodiment of the present invention.

FIG. 2 shows two interconnects according to an embodiment of the present invention that interconnect masters 20, 22, 24 and 26 to slaves 30, 32 and 34. In this case, interconnect 12 has been connected to interconnect 10 and this introduces re-convergent paths to some of the transactions that exit interconnect 10 and enter interconnect 12. Interconnect 10 if connected directly to slaves can send an early response using clearing units 80 as the subsequent paths are bisection paths and are connected to the exit of the interconnect, then no further blocking is generally required.

However, if rather than going to their destination devices transactions are sent to a further interconnect then it may no longer be appropriate not to block in response to barrier transactions travelling along these paths and if there are further cross coupled paths or as in this case reconvergent paths then it is appropriate on connecting to a further interconnect that introduces such paths to change the way the interconnect early responds and blocks. Thus, in order for the interconnect to be adaptable to different uses, it may comprise programmable blocking circuitry 92 which can be programmed to turn on or off depending on whether the interconnect is connected directly to slaves or to another interconnect with cross coupled or reconvergent paths.

Thus, programmable clear and block circuits 82 and 92 are controlled by control circuitry 76 which in response to interconnect 12 being connected to interconnect 10 blocks any barrier transaction that passes through it. In this way, the subsequent transactions are not allowed to pass until response signals have been received and their ordering is ensured.

As has been mentioned previously bather transactions block subsequent transactions that are controlled by them, this can be all transactions or a subset of them. The transactions that are controlled by a particular barrier transaction can be determined either from the barrier transaction itself or from the subsequent transactions.

Figure 3:
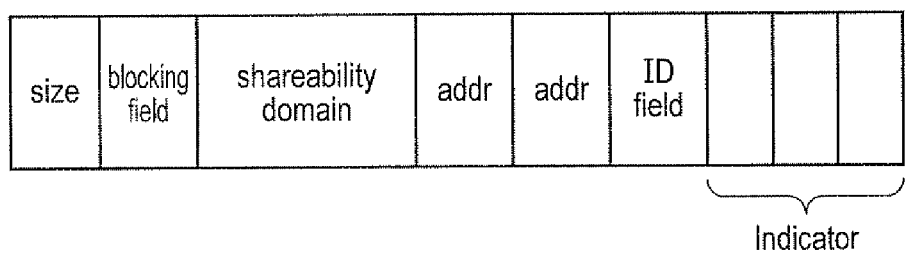
FIG. 3 schematically shows a barrier transaction request according to an embodiment of the present invention.

In embodiments of the invention barrier transactions have been designed to look not unlike other transactions that the interconnect transmits and in this way, interconnects can be configured to process these barrier transactions without the need for much re-design of the components. A schematic version of a barrier transaction is shown in FIG. 3.

In this embodiment the barrier transaction request contains address fields in a similar way to a general transaction request, but they are not used except for in addressed barriers that will be described later. It also contains a size field indicating the size of an address range that is covered by an addressed barrier transaction and an indicator field that contains indicator bits indicating various properties of the barrier transaction such as which transactions it applies to. There are two types of barrier transactions and there are two values of one of the indicator bits that indicate these two different barrier transactions. These two values will indicate to the interconnect both that the transaction is a barrier transaction and also what type of barrier transaction it is. Thus, they may indicate a system data synchronisation barrier (DSB) transaction which is used to separate transactions where the previous transactions must have completed and have reached their final destinations before any transactions that are after such a data synchronisation barrier in program order are allowed to occur. Thus, in response to the indicator bits indicating this sort of barrier the master will block subsequent transactions and there is no possibility of early responses to such transactions and thus, these barrier transactions will cause significant latency.

It should be noted that as the master will block subsequent transactions from entering the interconnect until it receives a response to the system DSB and as the response needs to come from the destination, other transactions can overtake the DSB as there cannot be any transactions that must stay behind the DSB as these have not been issued by the master. However, once they have overtaken the DSB they may interact with other transaction requests that are controlled by the barrier, at such a point the barrier becomes relevant to them and thus, although they may overtake the barrier, if they do so they must then stay ahead of it.

The other type of barrier transactions are data memory barrier transactions DMBs and transactions that are controlled by these barriers should not be allowed to be re-ordered with respect to this barrier. These barriers are only concerned with the ordering of the transactions and not of their progress through the system. Thus, these transactions can use early responses from clearing units and these techniques can be used to reduce the latency induced by these barrier transactions.

There are also other fields in the barrier transaction, one is an identification or ID field to identify the master that generated the transaction, one is a shareability domain field that indicates what shareability domain the barrier pertains to and this will be described in more detail later and one is a blocking indicator which can be set to indicate whether the transaction should be considered as blocking or not. If the indicator is set then this means that blocking has already be performed for this transaction and thus, clearing units and blocking units such as those shown in FIGS. 1 and 2 will simply pass the barrier transaction through and not respond as they know that subsequent transactions are blocked upstream. The utility of this will be described later. It should be noted however, that if there are reconvergent paths such as in the device shown in FIG. 2 then a blocking unit such as blocking unit 92 of FIG. 2 will react to barrier transactions that have their blocking indicator set as well as to those that do not and will block in response to them.

In some embodiments blocking indicators are not present on the barrier transactions, and all barrier transactions are treated as blocking where it is determined that they may need to be.

There may be other fields of control for the barrier transaction that indicates whether it controls only transactions of a particular function. Thus, one may have a barrier transaction that is only pertinent to write transactions.

The address field may be used to indicate barriers that only control transactions to a certain address or range of addresses. In the latter case, the address field stores a base address and the size field the size of the address range. Addressed barriers have the advantage of being able to control a very particular subset of transactions and not slow other transactions. Furthermore, where transactions are duplicated at split points, if it is known that the address or address range cannot be accessed down one or more of the exit paths the addressed barrier does not need to be duplicated, which reduces the latency and barrier handling overheads of the interconnect. As barrier transactions have been made to be similar to the other transactions, there is an address field present and thus, it is straightforward to provide the address information in an addressed barrier transaction.

Figure 4:
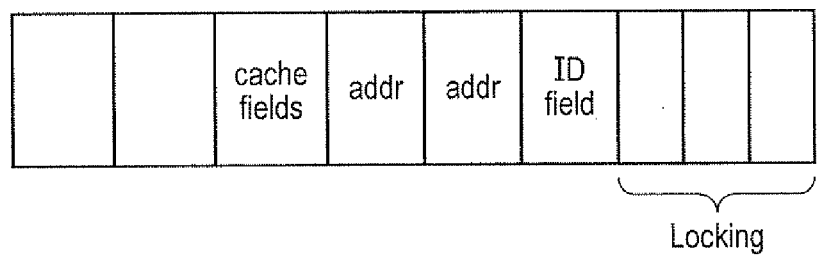
FIG. 4 schematically shows another transaction request.

FIG. 4 shows a transaction that is sent by the interconnect that is not a barrier transaction and as can be seen it is very similar to the barrier transaction in form. This has an indicator field within the locking bits which indicates whether or not the transaction should ignore barrier instruction transactions or not. Thus, marking a field like this in a transaction will allow it to proceed past any blocking automatically. This can be helpful if legacy systems are used with an interconnect that supports barriers.

As mentioned with respect to FIG. 3 there are shareability domains which are a way of segmenting the effect of barriers. This is a further way of improving the latency of the system and will be described in detail with respect to the following figures.

There are a number of different ways of grouping masters and portions of the interconnect into different domains and controlling the barriers and transactions within the domains to ensure that the correct ordering of transactions is maintained while not unduly increasing latency. In this regard, it has been recognised that if certain rules are imposed on the topology of the interconnect relating to the domains, then the barriers will have certain properties that can be exploited to reduce the latency of the barriers. Arranging the domains in particular ways may produce constraints in the permitted topologies of the systems but may also decrease the latency produced by barriers, thus there are advantages and disadvantages to the different possible implementations of domains that are described below.

In all of the arrangements of domains, if a barrier transaction is marked as relating to a particular domain, when it is outside of that domain it can always be unblocked except in a reconvergent region. Inside its domain a DMB can be unblocked except in a cross coupled region, while a DSB is always blocking inside its domain. A system DSB is marked as relating to the whole interconnect and thus, is never outside of its domain and is always blocking until a response from its destination is received.

In a first "null" implementation no account is taken of these domains. All barriers are treated as applying to all transactions in all parts of the system. This clearly is low in performance in that latency from the barriers will be high. However, it does permit unrestricted, arbitrary domain membership (even if that membership has no effect) and topology and so can always be built. This is logically equivalent to all domains including all masters in all their domains.

In an alternative "nearly null" implementation there are non-shareable domains that relate to each master and barriers related to these domains are treated differently outside of this domain. As a non-shareable barrier is outside its shareability domain everywhere beyond the input from the master, it can be treated as such in the whole interconnect and therefore be non-blocking in all non reconvergent parts of the interconnect. Other shareability domain barrier transactions are treated as in the null implementation. This is logically equivalent to making the non-shareable domain boundary the issuer or master input, and all other domains contain all other masters.

An alternative "simple" implementation has some restricted topology and improved performance. This approach yields two different solutions depending on the level of restriction that may be accepted.

Three restrictions on shareability domain membership are common to both of these approaches:
1. An observer's non-shareable domain is itself alone.
2. An observer's system shareability domain comprises at least all other observers that it can communicate with directly or indirectly.
3. All members of an observer's inner shareable domain are also members of its outer shareable domain.

The first two of these are the restrictions imposed by [3]. In addition, each of the two solutions has specific topological restrictions and possibly additional shareability domain membership restrictions.

The first of these two implementations requires a restriction that each location is in a single domain, and thus, depends on each location in the interconnect being in only one kind of domain, inner, outer or system. To enable this, an additional shareability domain membership restriction must be enforced:

All members of any shareability domain of any observer must have all other members of that shareability domain as members of their same level of shareability domain. I.e. if observer B is a member of observer A's inner shareable domain, then reciprocally A must be a member of B's inner shareability domain.

The topological restrictions that must be met are:
1. The domain boundary must include all members of the domain
2. Nothing outwith a domain may merge into the domain—i.e. the domain boundary must not include anything that is downstream of anything not inside the domain boundary 3. All domain boundaries must lie on domain bisection links A simple way to think of the domain boundaries in this case is as topographical contour lines representing altitude (where vertical faces are permitted, but overhangs are not). Each master is at the same height, and each shareability domain contour is at the same height as all others of the same type. Vertical cliffs are permitted to allow shareability domains of the different types to be identical, but overhangs, which would allow the crossing of shareability domains are not.

These topological restrictions require that nothing may merge into the domain—neither members of the domain (which would violate restriction 1) nor non-members (which would violate restriction 2) If a split downstream of a member exits the domain and then re-merges into it without also merging with something outwith the domain then the part between exit and re-entry is effectively still in the domain.

The topological and domain membership restrictions combined ensure that, within its shareability domain, a barrier cannot encounter a transaction from an observer outwith that domain and that when it exits the domain it will have merged with all transaction streams from all members of the domain that it will ever merge with. They also ensure that any location that is outside of any inner shareable domain is outside of all inner shareable domains, and if outside of any outer shareable domain is outside of all outer shareable domains.

As a result of this, the requirement for a barrier to be blocking at a split point may be determined by simply comparing the shareability domain of the bather with the domain type that the split point lies within as the requirement that no member of the shareability domain can merge downstream of the location is met implicitly by the barrier being out with that domain in such a constrained system.

This mechanism can be implemented by either explicit indication of the barrier being outwith its shareability domain, which would require an explicit detection component at domain exit points, or determination of that status at each relevant split point.

The second of these two implementations allows locations in multiple domains. This implementation depends on the indicated shareability domain of a barrier transaction being modified as it passes through the boundaries of shareability domains so that once it exits its shareability domain it becomes non-blocking by making the transition. As it passes out of an inner or outer shareable domain its indicated domain moves towards non-shareable, and when marked as non-shareable it is known to be outside its domain and so can be non-blocking.

In this case the additional restriction on shareability domain membership is looser:

For any two shareability domains, A and B, either all members of A must also be members of B or all members of B must also be members of A, or both (in which case A and B are identical). In other words, the domain boundaries may not cross.

The same topology restrictions are required:
1. The domain boundary must include all members of the domain To permit maximum flexibility of topology, it must just be possible to decompose the topology components (split and merge) so that the domain boundary may be drawn such that 2. Nothing outwith a domain may merge into the domain—i.e. the domain boundary must not include anything that is downstream of anything not inside the domain boundary
3. The domain boundary lies across domain bisection links Finally, an additional topological restriction is imposed to compensate for problems introduced by the looser restriction on domain membership:
4. No boundary location can be for a different number of domains for different masters excluding masters for which that location is already outwith their outer shareability domain.

Restriction 4 ensures that where a barrier has to be modified as it crosses a domain boundary, it crosses a boundary for all domains it is in. This ensures that the modification operation is not dependent on the originator of the bather.

If a barrier is modified and acquires non-blocking status, it may of course be unblocked if it is on a bisection link, but in some circumstances it may be unblocked despite being on a cross-coupled link. If the links crossing the domain boundary are domain bisection links that is they are bisection as far as that domain is concerned, i.e. they do not merge with paths from their own domain, only with paths coming from other domains, then the modification of the barrier transaction happens there and the unblocking may also occur from that point.

Restriction 2 may be waived if, in addition to changing the indicated domain towards non-shareable on domain exit, the indicated domain is changed away from non-shareable on domain entry. This requires a domain indicator that does not saturate, or a restriction on the number of domains that may be entered so that saturation does not occur. In addition, this will result in barriers that have entered a domain being blocking of transactions from non-members of that domain due to their increased indicated scope.

Figure 5A:
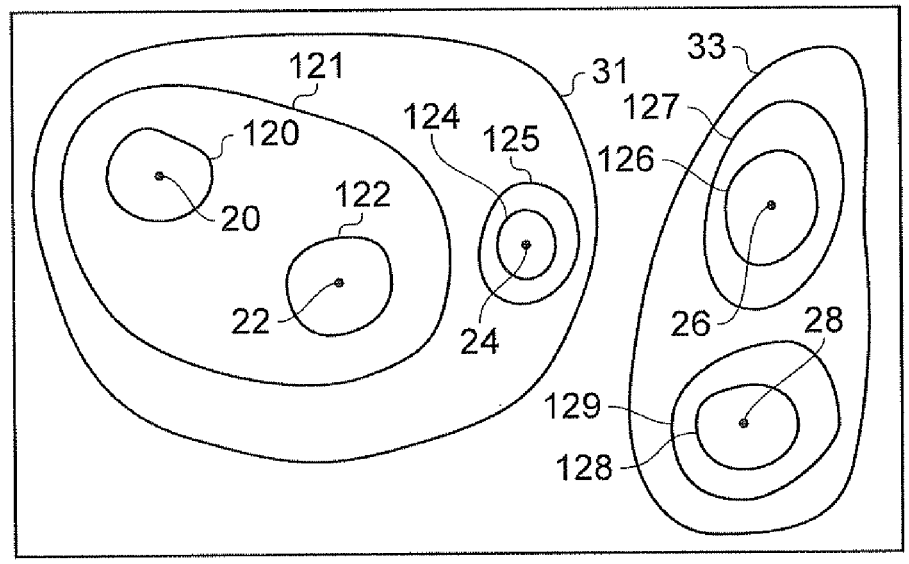
FIG. 5*a* schematically shows how domains within an interconnect are arranged.

FIG. 5a shows very schematically the above implementation of domains within an interconnect. In this figure the masters are shown within the interconnect although in reality they are of course external to it. Each master 20, 22, 24, 26, 28 has a stream or non-shareable domain 120, 122, 124, 126, 127 immediately surrounding it which is relevant only to transactions generated by itself. There are then some next hierarchical level domains which may encompass a plurality of masters or simply the same master again thus, masters 20 and 22 have their non-shareable domain and then have an inner domain 121 around them, while master 24 has an inner domain 125, master 26 has a non-shareable domain 126 and an inner domain 127 and master 28 has a non-shareable domain 128 and an inner domain 129. There are then outer domains which surround them which in this case are domains 31 and 33. There is then the system domain which is the whole interconnect. As can be seen domains lie completely within each other and do not intercept in any way. There is also a constraint that all exit paths from domains are bisection paths. By constraining the domains in this way one can be sure that transactions leaving these domains will do so in a certain way, and as they leave on bisection paths provided that within the domain the barriers function correctly they will leave in a correct order. This allows control of the barrier transactions with respect to these domains in a particular way.

Figure 5B:
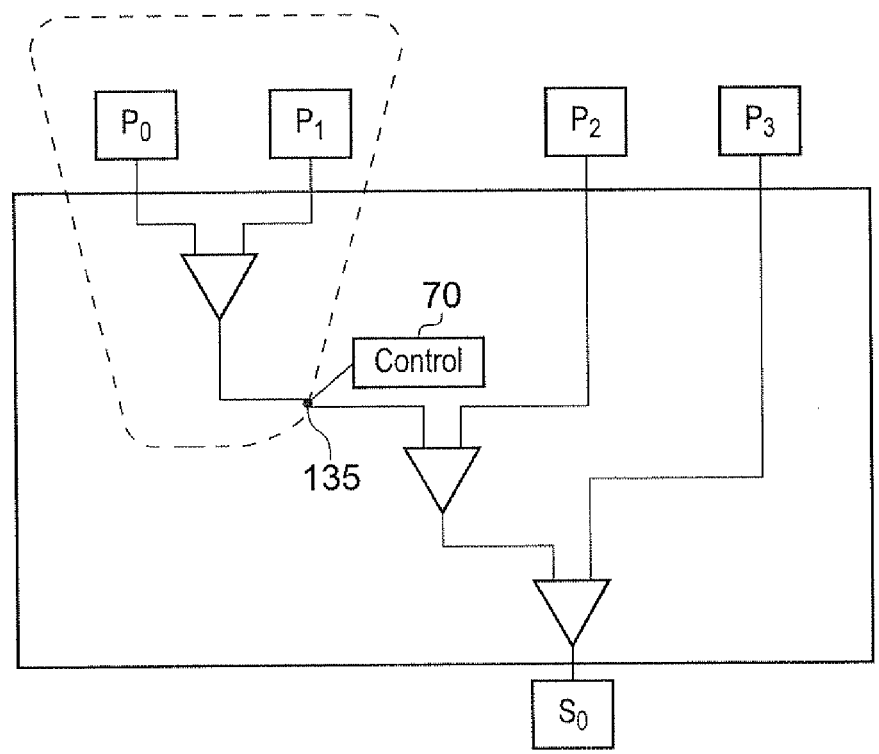
FIG. 5*b* shows a domain and its exit node in an interconnect according to an embodiment of the present invention.

FIG. 5b shows schematically an exit node 135 to a domain that includes masters p0 and p1. This exit node 135 is controlled by control circuitry 70 and at this node it is known that any barrier transaction and the transactions it controls are in the correct order. Now as noted previously barrier transactions do not necessarily control all transactions but may control transactions generated by particular masters or transactions of a particular function.

In the case of shareability domains, barrier transactions are marked as controlling transactions from particular domains. Thus, a transaction may be marked as a system barrier transaction in that it controls all transactions, it may be marked as controlling transactions from a stream or non-shareable domain, from an inner domain or from an outer domain. In any case, when a barrier transaction exits a domain it can in this implementation have this hierarchical level reduced so that if it were an outer domain barrier when it exited the inner domain it will be reduced to a barrier transaction controlling transactions from an inner domain and when it exits the outer domain it will have the hierarchical level of its control reduced to a non-shareable domain where no transactions need to be delayed by it. This is possible as at this point all the transactions are ordered with respect to this barrier and provided there are no re-convergent paths then the interconnect is sure that the ordering will be correct. It should be noted that system barriers do not change on exiting domains as they always apply to everything everywhere.

It should be noted that if there are reconvergent paths within a domain then any non-blocking barrier must become blocking across the reconvergent region. If a further interconnect that introduces re-convergent paths is connected to an interconnect having domains then the domain system of controlling barriers no longer works. If an interconnect is added that affects the domains and their hierarchy then the system is controlled such that the shareability domain indicator in the barrier transaction is not reduced when it exits the domain.

It should be noted with respect to reconvergent regions, that some transactions to particular addresses may be restrained to pass along a particular route through the reconvergent region and in such a case the reconvergent region is not reconvergent for that address. An interconnect may be constrained so that transactions pass along a particular route to a particular address for all addresses, in such a case any reconvergent region may be treated as a cross coupled region, which may be advantageous owing to the considerable constraints on the system that a reconvergent region imposes.

Owing to the way the interconnect is configured, any barrier transaction within a domain that is not marked as a non-shareable barrier will in effect control transactions of any domain that it encounters as it will not encounter transactions from another domain. A barrier transaction that is marked as a non-shareable barrier will not delay any of the transactions subsequent to it, however, no transaction will be allowed to be reordered with respect to this transaction. In this way, by arranging the interconnect domains in this way and by reducing the hierarchical level of the indicator on exit of the domains a simple way of determining whether the barrier transaction must delay all transactions it meets or none, is used without the need for the control components to know exactly which domain they are in within the interconnect.

A further possible implementation for the domains is the "complex" implementation. This can be used if the topological restrictions or domain membership restrictions above are considered too restrictive. Assuming the requirements on non-shareable and system domain membership are to be retained, the information required is an explicitly enumerated list of what combinations of barrier issuer and shareability domain may be considered non-blocking at that location. Thus, rather than being able to determine the blocking nature of the barrier from the barrier itself as in the implementations described with respect to FIGS. 5a and 5b, the blocking nature of the barrier is determined from the location, the domain information being stored at the location.

This can be done with two lists at each relevant location, one for inner shareable domains and one for outer shareable domains. Each list indicates the set or barrier sources for which the location is outside of that domain. Alternatively, a list could be stored of sources with a two bit value indicating which shareability domains of that source the location is outside.

However the information is represented, it is clearly significantly more complex and more difficult to enable design reuse due to differing requirements to represent the domain information when a system is reused.

Figure 6:
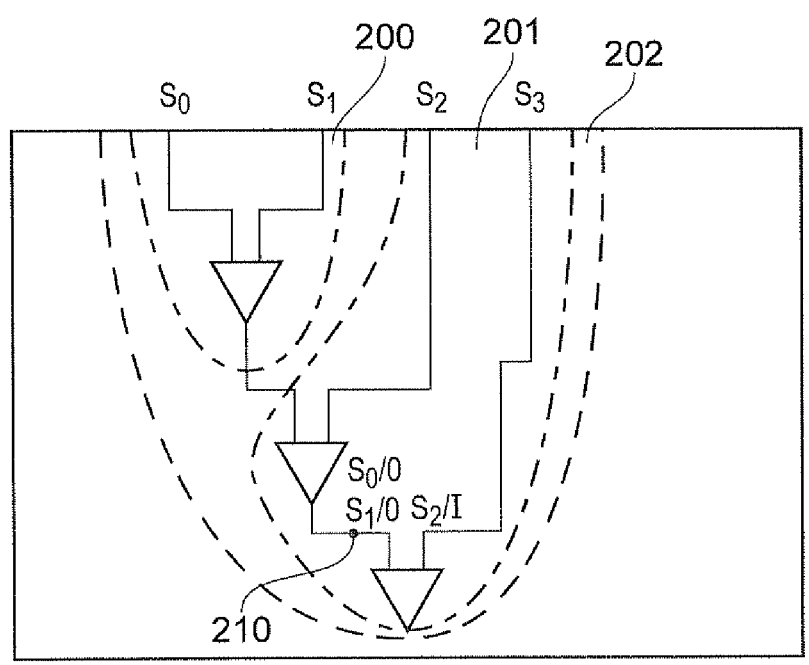
FIG. 6 shows a further arrangement of domains in an interconnect according to a further embodiment of the present invention.

FIG. 6 shows an example of such an interconnect. This interconnect receives transaction requests from four masters, S0, S1, S2 or S3. S0 and S1 are in an inner domain 200, while S2 or S3 are in an inner domain 201 and they are all in an outer domain 202. There are other masters not shown that have other domains.

At location 210 one is in the inner domain for transactions coming from S2 and in the outer domain for transactions coming from S0 or S1. Thus, this location can be marked as such, and when barriers are received it can be determined which domain they relate to and thus, whether or not the barrier is outside of its domain. Thus, a barrier that applies to the S0, S1 inner domain is outside of its domain and it can be marked as such or an early response sent depending on the embodiment. This is clearly quite complicated.

An alternative to this is the conservative complex implementation. This is used if the topological and domain membership freedom of the complex implementation is required but the implementation and re-use issues must be avoided. In this case it is possible to make every component which must exhibit domain-location-specific behaviour consider itself to be in a particular level of domain and achieve correct behaviour. If the component considers itself to be in the smallest domain of any that it actually lies within then it will be conservative (yet correct) in its behaviour for barriers that are actually outside their domain and correct for those that are within their domain. In this regard it should be noted that the properties of barriers, domains or transactions can be changed where that may enable them to be treated more efficiently provided they are changed to be more restrictive. Thus, a barrier that is marked as inner can be treated as an outer barrier and a transaction that is marked as applying to an outer domain can be marked as applying to the inner domain.

With this approach, the components that need to be domain aware can simply be programmed or configured to have a single domain (with a safe default of inner domain membership, this can be used on power up).

Thus, in this implementation a location within the domains is marked as having the properties of the domain with the most restrictive behaviour it is a member of, which is the domain of the lowest hierarchical level excluding the non-shareable domain. Barrier transactions at that location are then treated as being within such a domain. In such an arrangement domains are allowed to be a partial subset of other domains. In this arrangement rather than changing the marking on a barrier as it exits domains in order to adjust the blocking behaviour of the barrier without the need to know where in the interconnect one is, locations in the interconnect are marked as being in a particular domain, depending on the lowest hierarchical or smallest shareable domain they are located in.

In the example of FIG. 6 for example, the location 210 does not need to be marked with three different marks, it is simply marked with the most smallest shareable domain that it is within, that is inner. Thus, in this case any barrier marked as being inner or outer is considered to be within this domain and a barrier from the S0, S1 inner domain will be considered to be within its domain, even though it is not. Thus, no early response can be sent and the latency of the interconnect will increase which is the downside of this approach. However the marking of the domain is simpler as is the determination of whether a barrier is within the domain or not.

Figure 7:
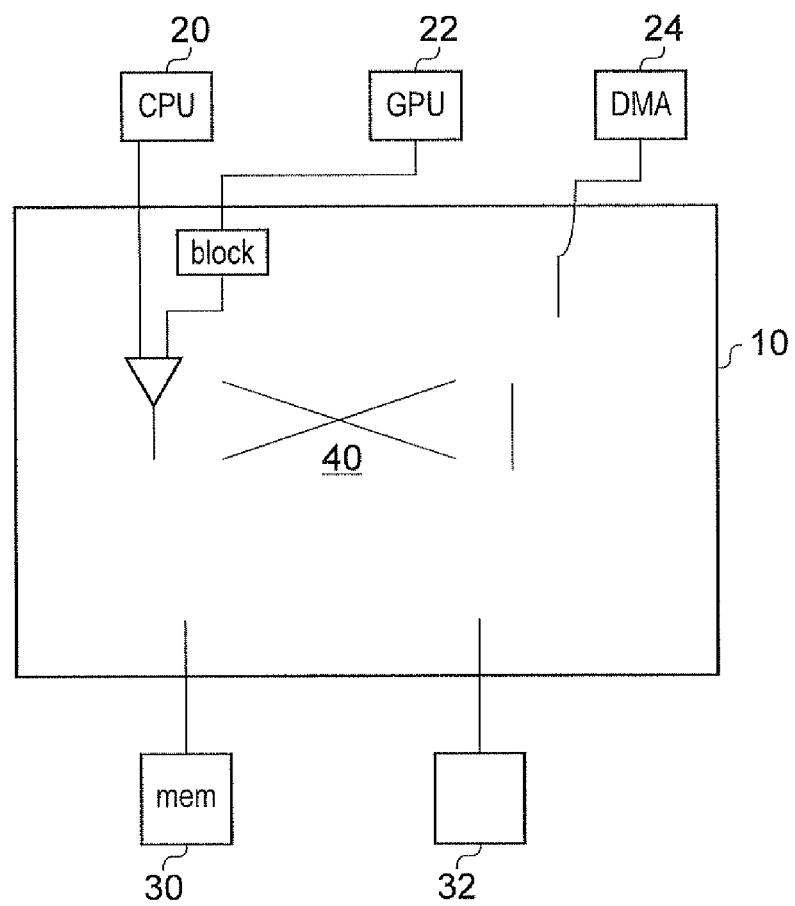
FIG. 7 shows a further interconnect according to an embodiment of the present invention.

FIG. 7 shows a further interconnect 10 having a plurality of masters 20, 22 and 24 and a plurality of slaves 30, 32. There is cross-coupled circuitry 40 not shown in detail between them.

This figure illustrates the use of the blocking indicator on the barrier transaction to indicate to the interconnect that the barrier has already been blocked upstream and the interconnect need take no further blocking action. Thus, in this case transactions issued by the GPU 22 are transactions for which latency is not important and thus, there is a blocking unit 90 that reacts to the barrier transactions issued and blocks the subsequent transactions to the barrier and marks the barrier transactions as being blocking barrier transactions. This means that no early response unit within interconnect 10 will early respond to this barrier transaction and all subsequent blocking units will not block in response to it. Thus, the barrier transaction stays as blocking until the barrier transaction itself reaches its final destination whereupon a response signal is sent to the GPU 22 and blocking circuitry 90 removes the block. It should be noted that although blocking circuitry 90 is shown within interconnect 10 it may be within the GPU 22 itself.

The advantage of being able to do this is that as noted previously where latency of transactions from a master are not important blocking these transactions close to the source means that the barrier transaction will not impose a latency penalty on the other masters by blocking transactions issued by them in the cross coupled region. It should be noted that if there are reconvergent paths in the interconnect, then blocking units within the interconnect may need to block in response to a barrier transaction to ensure correct ordering.

In embodiments that do not use this blocking indicator then all barriers inside their domain are considered to be blocking unless they are marked in some way as not being blocking.

Figure 8:
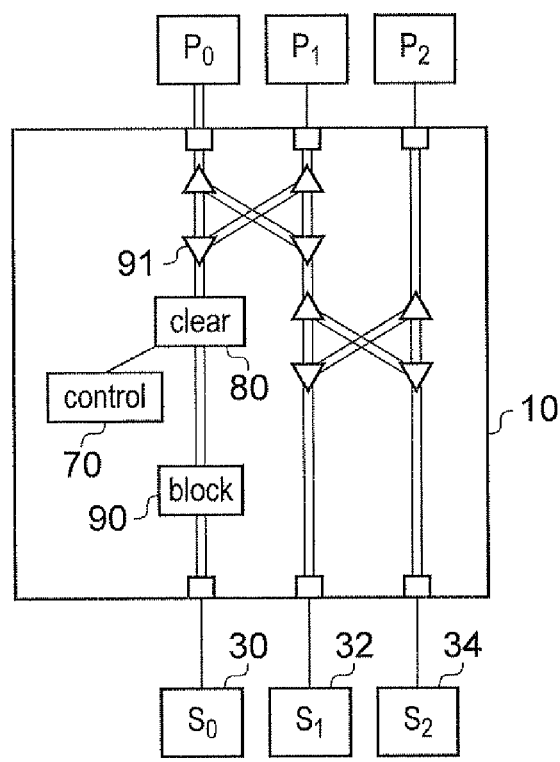
FIG. 8 shows an interconnect having parallel read and write paths according to an embodiment of the present invention.

FIG. 8 shows an interconnect 10 that is typical to ARM™ of Cambridge United Kingdom AXI™ busses. These busses have read and write channels in parallel and thus, they could be considered to have no bisection paths. However, transactions that travel along these paths are generally linked and provided one links a transaction along the other one of the paths to a barrier transaction that is sent, these paths can be treated as bisection paths and early responses and subsequent blocking can be used to reduce the latency of the barrier transaction. Thus, in this figure there is shown a path where an early response unit 80 generates an early response to a barrier transaction. It also provides a linked transaction to be sent down the other parallel path to the path the barrier transaction is travelling down. The subsequent blocking unit 90 will not send the barrier transaction further until the linked transaction is received. It should be noted that this behaviour of sending linked transactions and only respond-ing when both have reached their destination is required where the barrier can merge, thus, at merge points such as 91 or within a slave. Thus, when sending blocking barrier transactions from blocking unit 90 to slave S0 a linked transaction needs to be sent and a response only sent when both the barrier transaction and its linked transaction have been received. The path that the blocking transaction is sent down is the only of the paths that is actually blocked.

It should be noted that were the read and write streams are to be merged, then the streams must be lined up at the merge point, thus, there must be some control mechanism to ensure that the barrier and linked transaction arrive at the merge point at the same time.

Figure 9:
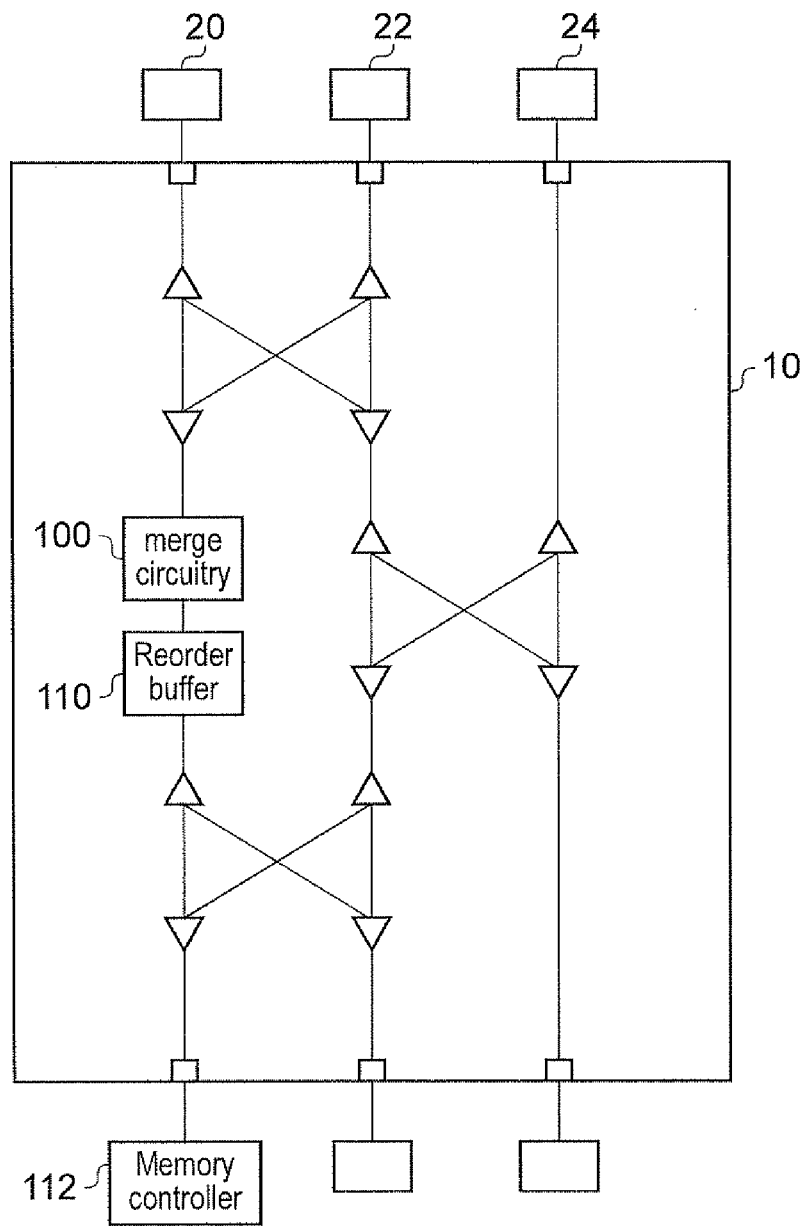
FIG. 9 shows an interconnect having a capacity to merge barrier transactions according to an embodiment of the present invention.

FIG. 9 shows an interconnect 10 according to an embodiment of the present invention that comprises a plurality of inputs to receive signals from masters 20, 22 and 24 and a plurality of outputs for sending the transaction request to a variety of slaves including memory controller 112.

The paths that the transactions are sent along include bisection paths and cross-coupled paths. The interconnect is configured to respond to barrier transaction requests to ensure ordering of transactions with respect to these barriers. There is merge circuitry 100 present that is used to increase the performance of the interconnect by merging barrier transactions where applicable. Thus, if it detects two barrier transactions adjacent to each other, it will merge them into a single barrier transaction and a response from that merged barrier transaction will cause response signals to be sent to both of the barrier transactions that have been merged.

It should be noted that if the barrier transactions have different properties then they may not be suitable for merging or they may need these properties amended so that the merged barrier transaction has a property that will enable both barrier transactions to function. Thus, for example, if the shareability domain of one of these barrier transactions indicates that it controls transactions from inner domain 1 and the adjacent barrier transaction from outer domain 1 which includes inner domain 1 and a further initiator devices, then the shareability domain of the merged barrier transaction will be outer domain 1. In other words, a shareability domain that encompasses both the shareability domains of the two barrier transactions that are merged will provide a merged barrier transaction that functions correctly. It should be noted, that if there are three or more adjacent barrier transactions then these too can be merged.

Merge circuitry 100 can also merge barrier transactions that are not adjacent but that only have intervening transactions that are not subject to the barriers. This can be done if the merge circuitry 100 is close to a re-order buffer 110. A re-order buffer is generally used to re-order transactions so that high priority transactions can be placed ahead of lower priority transactions and can exit to their particular slave ahead of the lower priority transactions. It can also be used in conjunction with merge circuitry 100 to re-order barrier transactions that are not adjacent but that only have intervening transactions that barriers do not apply to. In this case the barrier transactions can be moved adjacent to each other and they can then be merged. It should be noted that this merge circuitry needs to be on a bi-section link otherwise, merging the barriers might cause some incorrect ordering due to duplicate barriers travelling down other paths.

Figure 10:
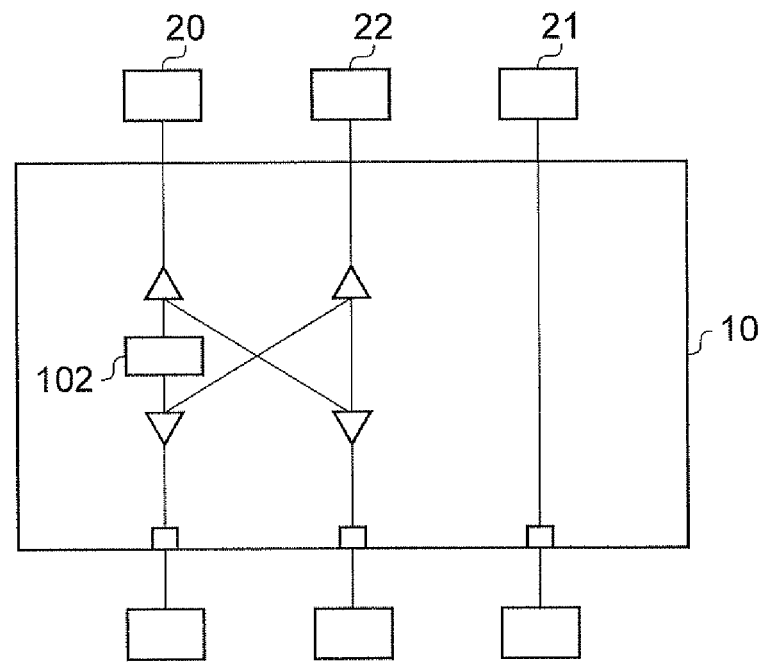
FIG. 10 shows an interconnect having a capacity to eliminate barrier transactions according to an embodiment of the present invention.

An alternative to merging barriers is eliminating them. FIG. 10 shows a similar circuit to FIG. 9 but with barrier elimination circuitry 102. It should be noted that in some embodiments the merge circuitry 100 and the elimination circuitry 102 are a single unit and act either to merge or eliminate barriers depending on circumstances. Barrier elimination circuitry 102 can be used on any path including cross-coupled and bisection paths and if it detects a barrier following another barrier which would apply to all non-barrier transactions that the following barrier would apply to and with no intervening non-barrier transactions to which the following barrier applies then this subsequent barrier may be stalled by the barrier elimination unit 102 until responses have been received for all such previous barriers. Once these responses have been received, these can be sent upstream and a response to the new barrier can also be sent upstream and this barrier can be eliminated. In this way, a barrier is removed from the interconnect circuitry and it increases performance.

Figure 11:
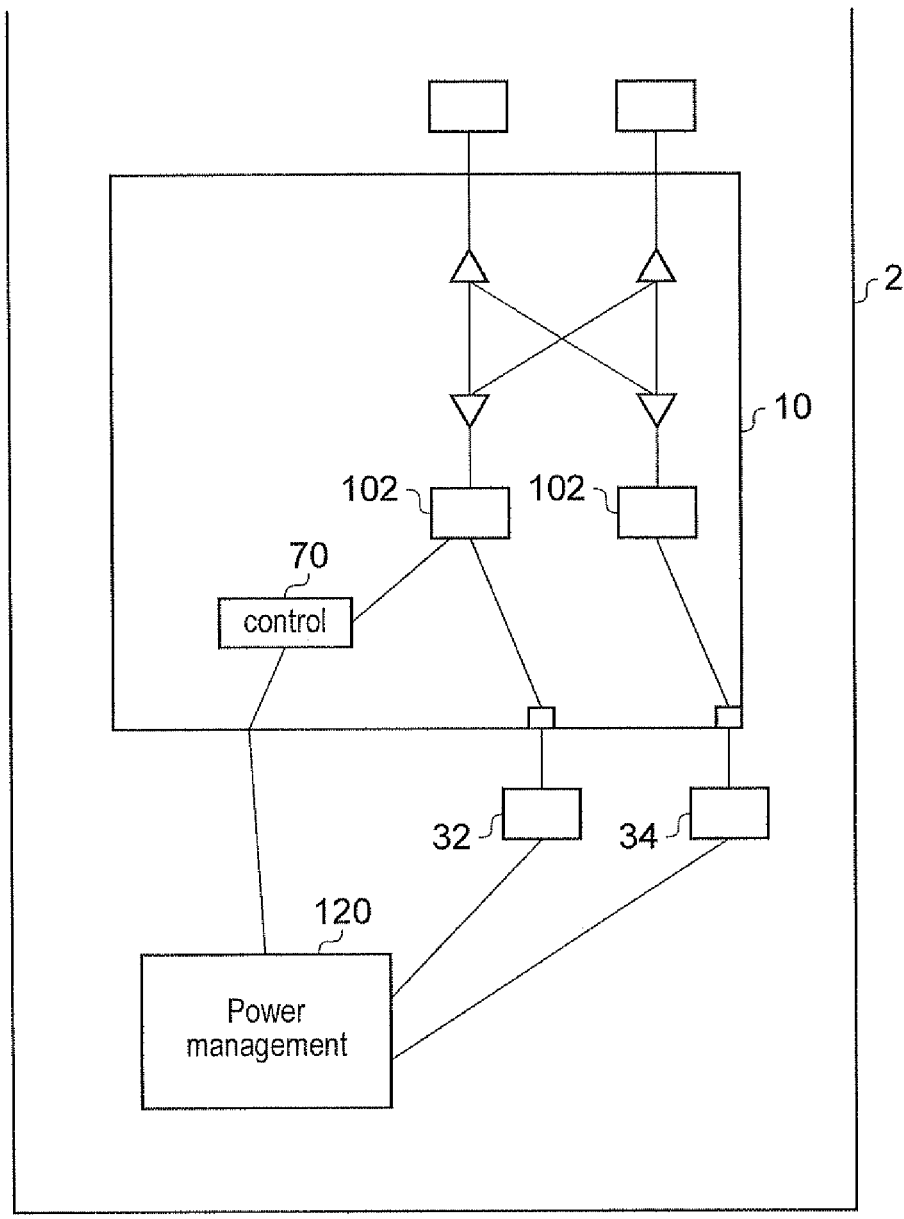
FIG. 11 shows a data processing apparatus having an interconnect according to an embodiment of the present invention.

This ability to perform in this way has an additional advantage that can be used when managing peripherals that are not used very often. FIG. 11 shows a data processing apparatus 2 having interconnect circuitry 10, power management unit 120 and several peripherals 32, 34 that enter inactive mode for long periods of time. Control circuitry 70 is used to control various portions of interconnect circuitry 10.

Transactions requests sent to peripherals 32 and 34 during their inactive periods may only be barrier transactions. These need to be responded to, but it would be disadvantageous if the peripheral is in a low power mode to wake it up simply to respond to a barrier transaction. In order to address this problem a barrier elimination unit 102 is used. A barrier elimination unit 102 placed on the paths to the peripherals enables a barrier to be generated by barrier elimination unit 102 in conjunction with control circuitry 70 and sent to the peripherals. Once the response has been received the peripherals can enter low power mode and then, on receipt of a further barrier transaction as a response has been received for a previous one, a response can simply be sent to the further barrier transaction without waking the peripherals and this barrier transaction can be eliminated.

The control circuitry 70 can trigger the barrier elimination unit to generate a barrier transaction in response to detecting inactivity of the peripherals and can then contact the power management circuitry to suggest that they enter low power mode once a response has been received. Alternatively, once a barrier transaction has been sent to the peripherals the control circuitry 70 could indicate this to the power management circuitry 120 which could then send a low power mode signal to the peripherals such that they enter low power mode. Alternatively, if the power management circuitry decides that it is time for the peripherals to enter low power mode it can signal this to the peripherals and to the control circuitry 70 at the same time. Entry to the low power mode can be delayed until a barrier transaction has been sent to the peripheral and a response received. At this point, the peripheral can enter low power mode and any subsequent barrier transactions can be responded to without the need to wake the peripheral.

Figure 12:
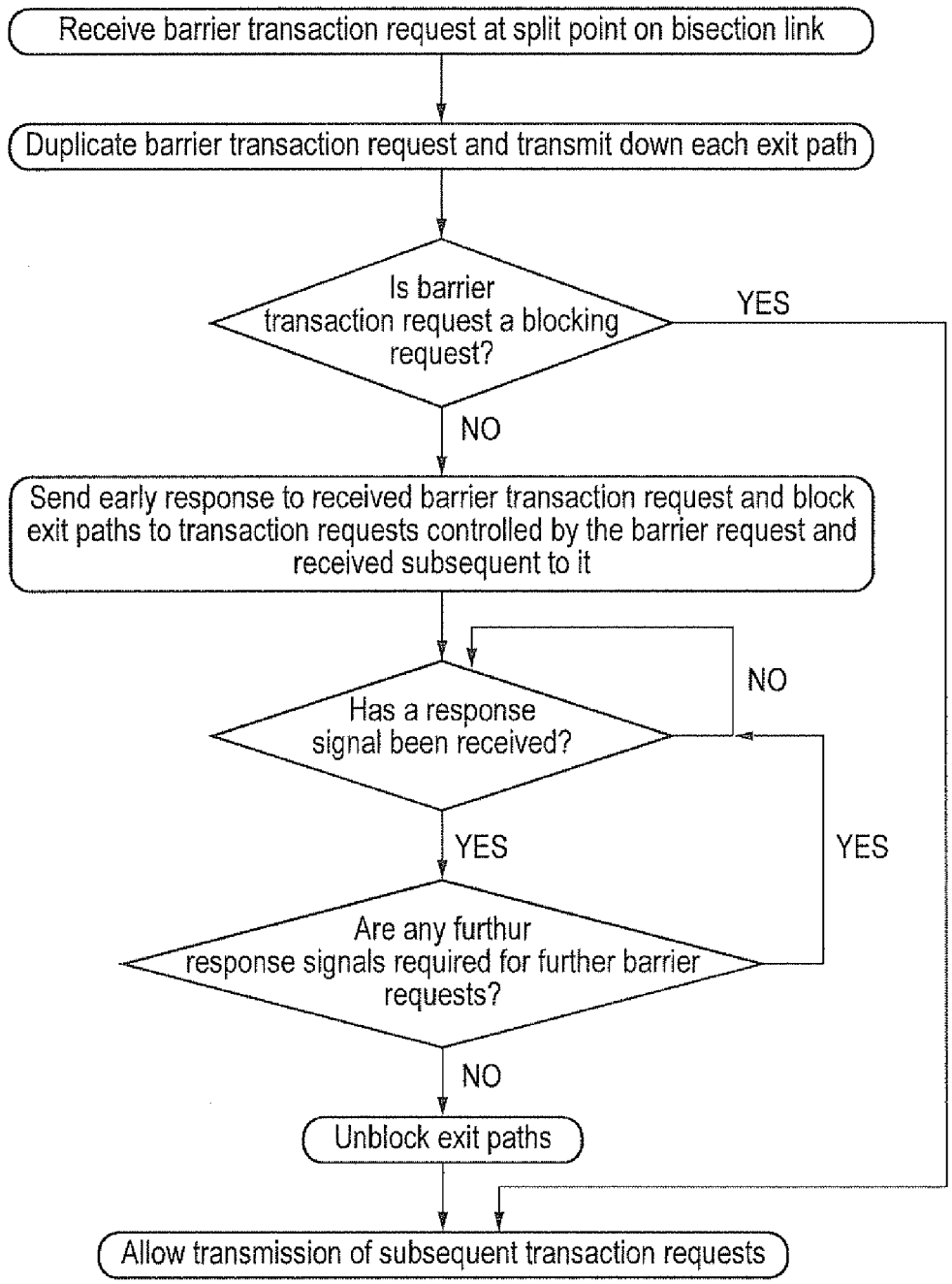
FIG. 12 shows a flow diagram illustrating steps in a method for moving a block due to a barrier transaction through an interconnect according to an embodiment of the present invention.

FIG. 12 shows a flow diagram illustrating a method of in effect moving a blocking barrier through an interconnect by sending an early response clearing signal and blocking further along the interconnect. In response to a barrier transaction request an early response signal is sent that a blockage upstream will receive and then clear so that subsequent transaction requests controlled by the boundary transaction request can be sent further. The circuitry then sends the barrier transaction request further itself but blocks the exit paths that it sends it along to subsequent transaction requests that are controlled by the barrier transaction request. If there are several paths it duplicates the barrier transaction request such that it is sent along each of the several paths. The circuitry then awaits response signals from each of the barrier transaction requests that have been sent further. When it receives these it can unblock the subsequent transaction request that has been blocked and these can be sent on. In this way, the latency of the interconnect is reduced as the blocking signal moves through it and the subsequent transaction requests are not held at the master until the barrier transaction request has completed at the slaves. It should be noted that for a data synchronisation barrier request no early response signal is permitted and these will cause the interconnect to be blocked to subsequent transaction requests that are controlled by the barrier until there is a clearing response from each of the peripherals that the barrier is sent to.

It should also be noted that if the barrier transaction request is a blocking request then no early response signals are sent in response to this transaction request either. A blocking request is one that is blocked upstream and is marked as such to indicate that the blockage should remain upstream. As there is a block upstream one can be sure that none of the transactions that it acts as a barrier to will be transmitted past the upstream block until a response signals is received to the barrier transaction request and thus, there is no need to block for this barrier transaction request.

It should be noted that there may be some points within the interconnect circuitry where an early response can be sent to a blocking request and the blockage moved downstream, with the reissued barrier itself being marked as either blocking or non-blocking. If it is non-blocking it is indicating that there may be transactions after it that need blocking, which is not the case as they will already have been blocked but this is OK, it is not OK to indicate that there are no transactions that need blocking if in fact some may exist. This may be useful, where a non-blocking barrier crosses a cross-coupled region and so subsequent transactions must be delayed, but you don't want it to block all the way to the exit points so you keep indicating it as non-blocking so that an early response is sent from the first location that is permitted to do so.

Thus, if the request is not a data synchronisation barrier transaction request or a blocking request, then an early response is sent and the exit paths that the duplicated barrier transaction requests have just been sent down are blocked to subsequent transaction requests that the barrier transaction request pertains to. In this way, the upstream paths are unblocked to subsequent requests and they can be sent as far as this new blockage which will reduce the latency of the system while still maintaining the required ordering. These subsequent requests will then be stalled at this point until this node is unblocked. It should be noted that in some cases the topology is such that giving an early response and blocking may actually be counterproductive, for example in cases where everything upstream is bisection there may be nothing that would benefit from unblocking and blocking at this point may be the first and unnecessary block.

To unblock the node the following steps are performed. It is determined if a response signal to any of the duplicated barrier transaction requests that have been sent further has been received. When one is received then it is determined if there are further response signals awaited for the further barrier requests. When all of the duplicated barrier requests have responded then the exit paths can be unblocked and the subsequent transaction requests can be transmitted further.

Figure 13:
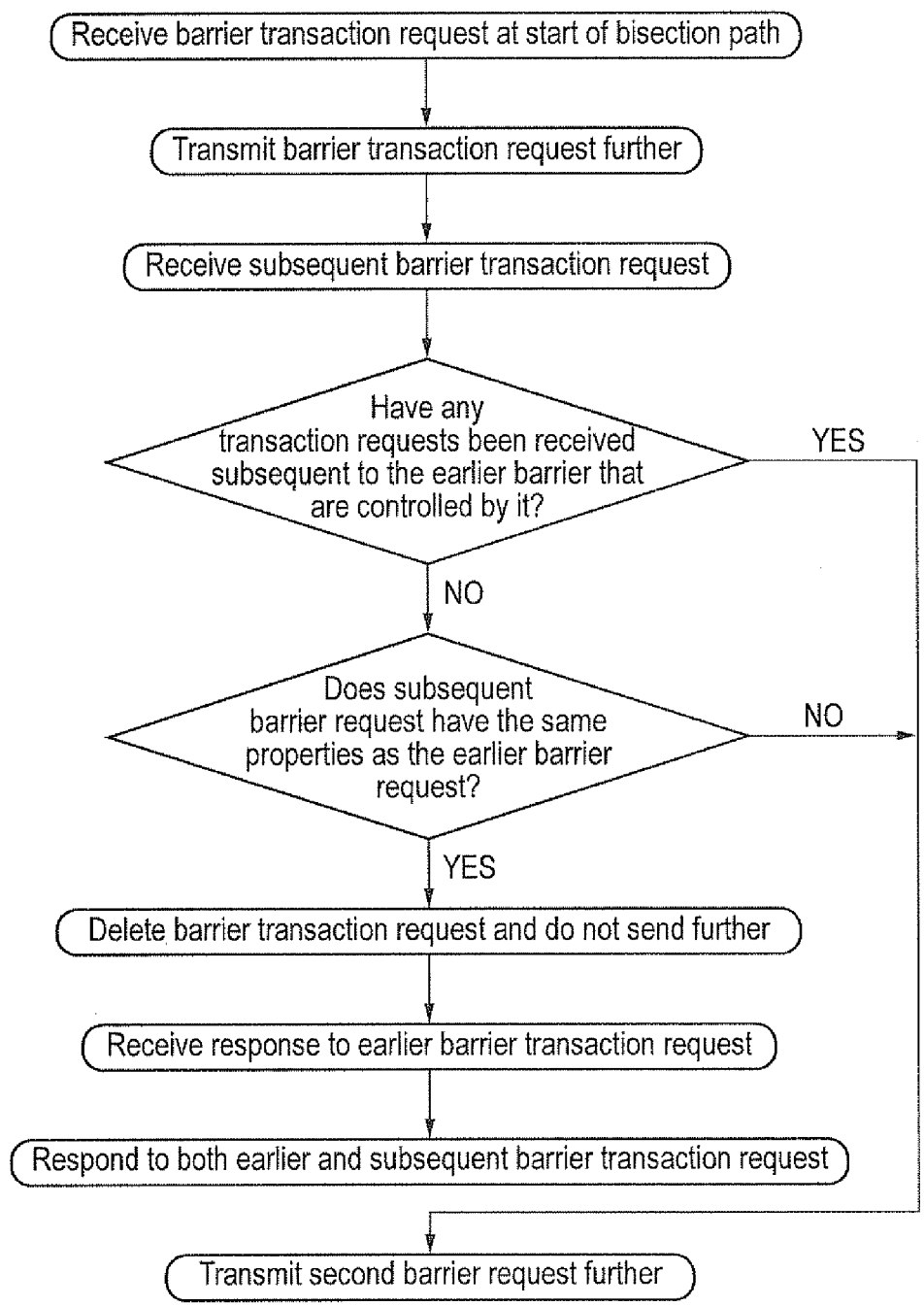
FIG. 13 shows a flow diagram illustrating steps in a method for eliminating a barrier transaction request according to an embodiment of the present invention.

FIG. 13 is a flow diagram illustrating steps in a method of eliminating barrier trans action requests.

A barrier transaction request is received at the start of a bisection path and is transmitted further along the bisection path.

A subsequent barrier transaction request is then received and it is determined if any transaction requests have been received subsequent to the original barrier request that are controlled by it. If there have been no such transactions then it is determined if the subsequent barrier transaction request has the same property as the earlier barrier transaction request. If it does then the subsequent barrier transaction request is deleted and not sent further and a response is sent to this barrier transaction request when a response is received from the earlier one. This is possible as the subsequent barrier transaction request has the same properties as the first one, the first one will act as a boundary to the transactions subsequent to the second one, and thus, there is no need to send the second one further. This reduces the amount of processing that needs to be performed by the control circuitry controlling these barrier transactions requests and can have additional advantages with peripherals in low power mode as becomes clear with respect to FIG. 14. It should also be noted that although not shown in this figure if the second barrier request is sent further then the interconnect operates in the normal way for two barrier requests.

If the subsequent barrier transaction request does not have the same properties as the earlier one then it needs to be sent further and responded to in the usual way. If the subsequent one affects a subset of transactions to the earlier one, for example it has a narrower shareability domain or affects writes only, as opposed to all functions then it can be responded to.

It should be noted that as this is on a bisection path, an early response could be sent to both barrier transaction requests when they are received and the second one could simply be deleted and the blockage required at the end of the bisection path need only be applied to the subsequent one.

It should also be noted that although this flow diagram is shown with respect to a bisection path, elimination of a subsequent barrier transaction when the barriers have the same properties and there are no intervening transactions subject to the barriers can be done on any path provided a response is sent to both bathers when it is received for the first one.

Figure 14:
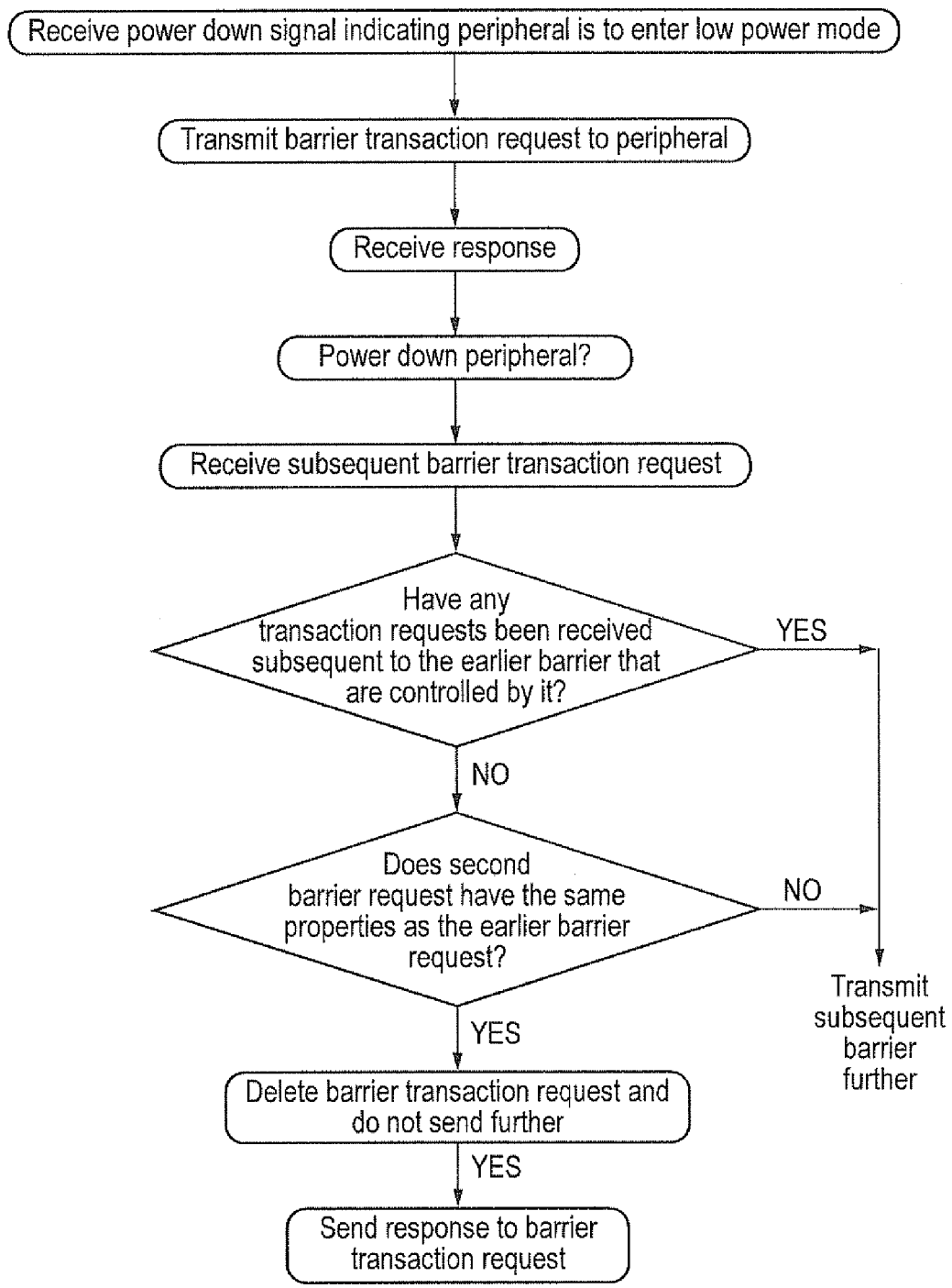
FIG. 14 shows a flow diagram illustrating steps in a method for controlling peripherals to enter a low power mode according to an embodiment of the present invention.

FIG. 14 shows a flow diagram illustrating the steps in a method for controlling peripherals to enter low power mode taking advantage of the properties of bather boundary elimination described with respect to FIG. 13. A power down signal is received indicating a peripheral is to enter a low power mode. In response to receipt of this signal, a barrier transaction request is submitted along a bisection path to the peripheral and a response is received. The peripheral is then powered down. On receipt of a subsequent barrier transaction request it is determined if any transaction requests have been received subsequent to the earlier barrier that were controlled by it. If none have been received then this later barrier transaction request, if it has the same properties as the earlier barrier transaction request, can be deleted and not sent further and a response to it can be sent. In this way, if the peripheral is in a state of inactivity then it need not be disturbed and woken up by a barrier transaction request.

Figure 15:
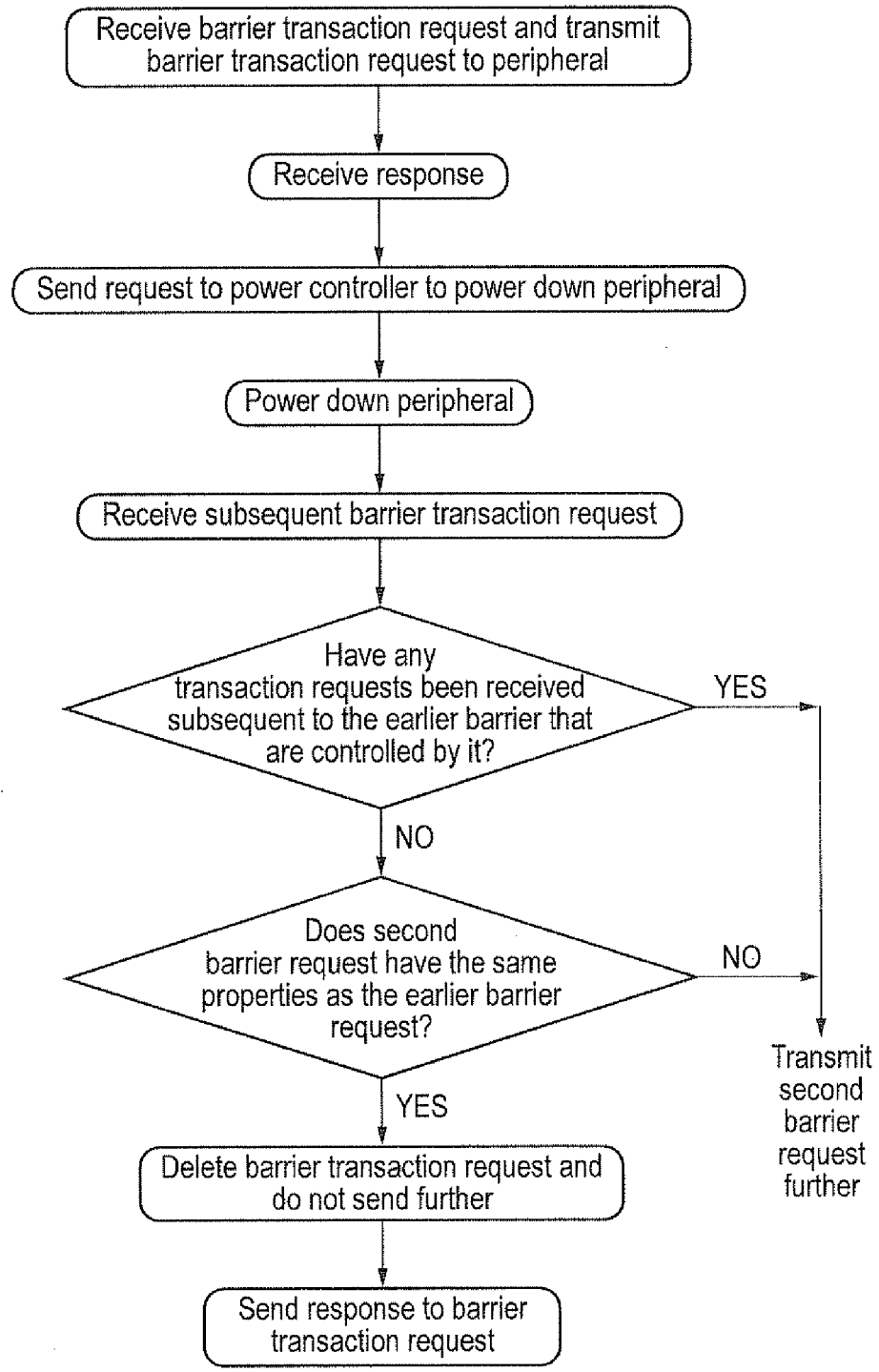
FIG. 15 shows a flow diagram illustrating steps in a method to reduce the power consumption of a peripheral according to an embodiment of the present invention.

If there are intermediate transactions controlled by the earlier barrier or if the second barrier does not have the same properties as the earlier barrier then the barrier cannot be deleted but must be transmitted further in the usual way FIG. 15 shows a flow diagram illustrating steps in a method to reduce the power consumption of a peripheral. A barrier transaction request is received and transmitted to the peripheral and a response is received in reply to it. In response to receiving this barrier transaction request it is recognised that subsequent barrier transaction requests can now be eliminated and thus, it may be a convenient moment for the peripheral to enter low power mode. Thus, a request is sent to the power controller to power down the peripheral and the peripheral is powered down. Now subsequent barrier transactions that are received, provided no intermediate transaction request controlled by the earlier boundary request have been received and provided they have the same properties, can be deleted and a response to them sent without the need to disturb the sleeping peripheral.

If intermediate transactions controlled by the earlier barrier have been received or if the second barrier does not have the same properties as the earlier barrier then the barrier cannot be deleted but must be transmitted further in the usual way.

Figure 16:
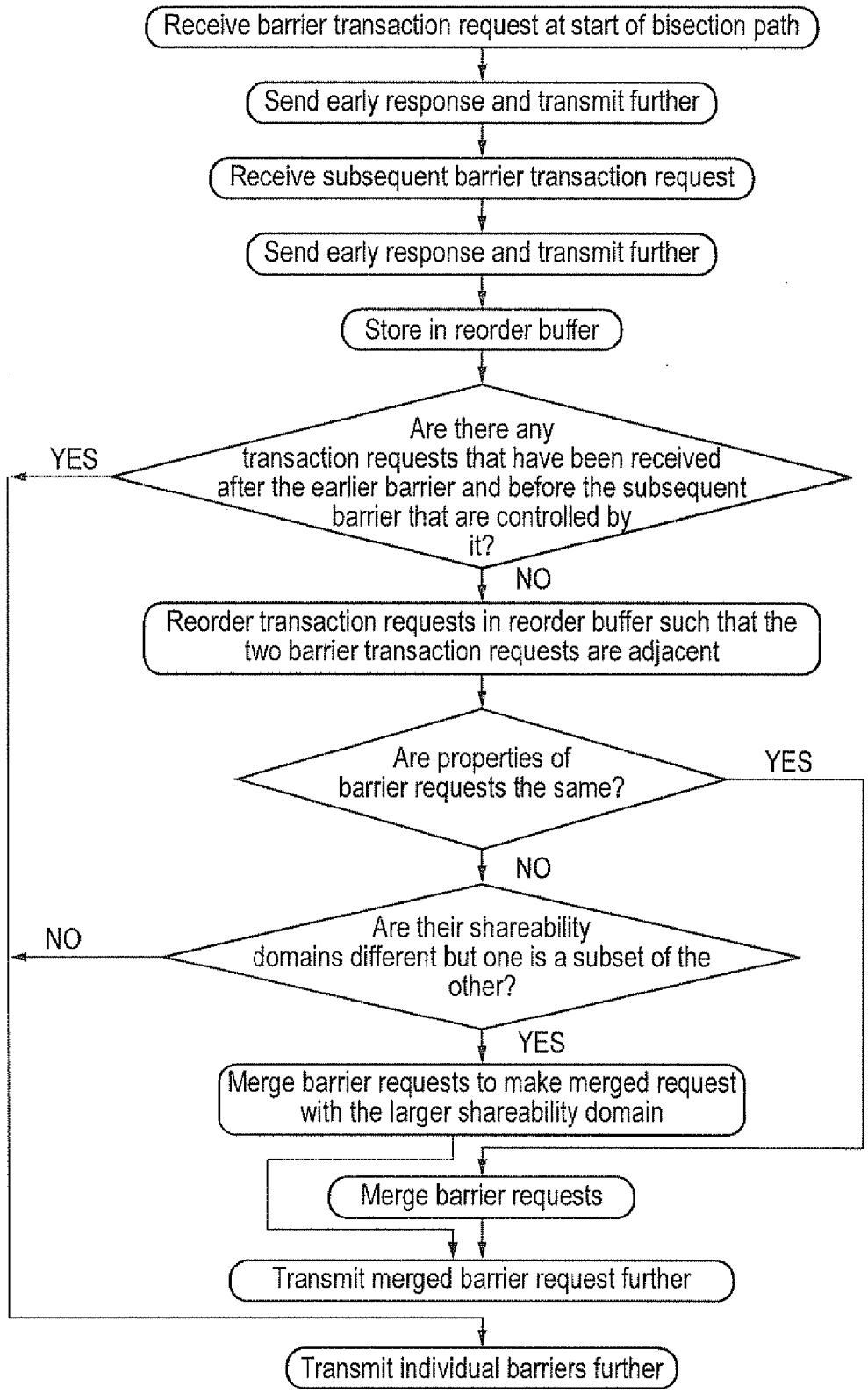
FIG. 16 shows a flow diagram illustrating steps in a method to reduce the overheads associated with barrier transactions by merging them where possible according to an embodiment of the present invention.

FIG. 16 shows steps in a method of reducing the overheads associated with barrier transaction requests by merging them where possible.

Thus, a barrier transaction request is received at the start of a bisection path and an early response is sent and the barrier transaction request is transmitted further. As it is the start of a bisection path there is no need at this point to block the path for subsequent transaction requests.

A subsequent barrier transaction request is then received an early response is sent and the barrier is sent further. There is a reorder buffer on the bisection path and both barriers are stored in this. It is then determined if any transaction requests have been received subsequent to the earlier barrier that were controlled by it and were received before the subsequent barrier. If there aren't any the two barrier transaction requests are moved to be adjacent to each other at the position of the subsequent one. If there were no intervening transactions that the subsequent barrier would control then it could be moved adjacent to the earlier one. It is then determined if the properties of the barrier requests are the same. If they are then they can be merged and a single barrier request sent further at the correct point in the stream. If they do not have the same properties then it is determined if the properties are the same except for the shareability domains and it is also determined if one of the shareability domains is a subset of the other. If this is the case then the barrier requests can be merged and the merged request given the larger of the two shareability domains. The merged barrier requests are then sent further. If the properties of the barrier requests are such that they cannot be merged then the separate requests are sent further.

It should be noted that although merging of barriers is described above with respect to a reorder buffer, adjacent barrier transactions with suitable properties can be merged on a bisection path, without the need for a reorder buffer.

It should also be noted that in a reorder buffer if there are transactions that could be reordered except for a barrier instruction between them that inhibits this reordering, then in some embodiments it is permissible to merge the transactions and to generate two barriers one on either side of the resulting merged transactions.

Figure 17:
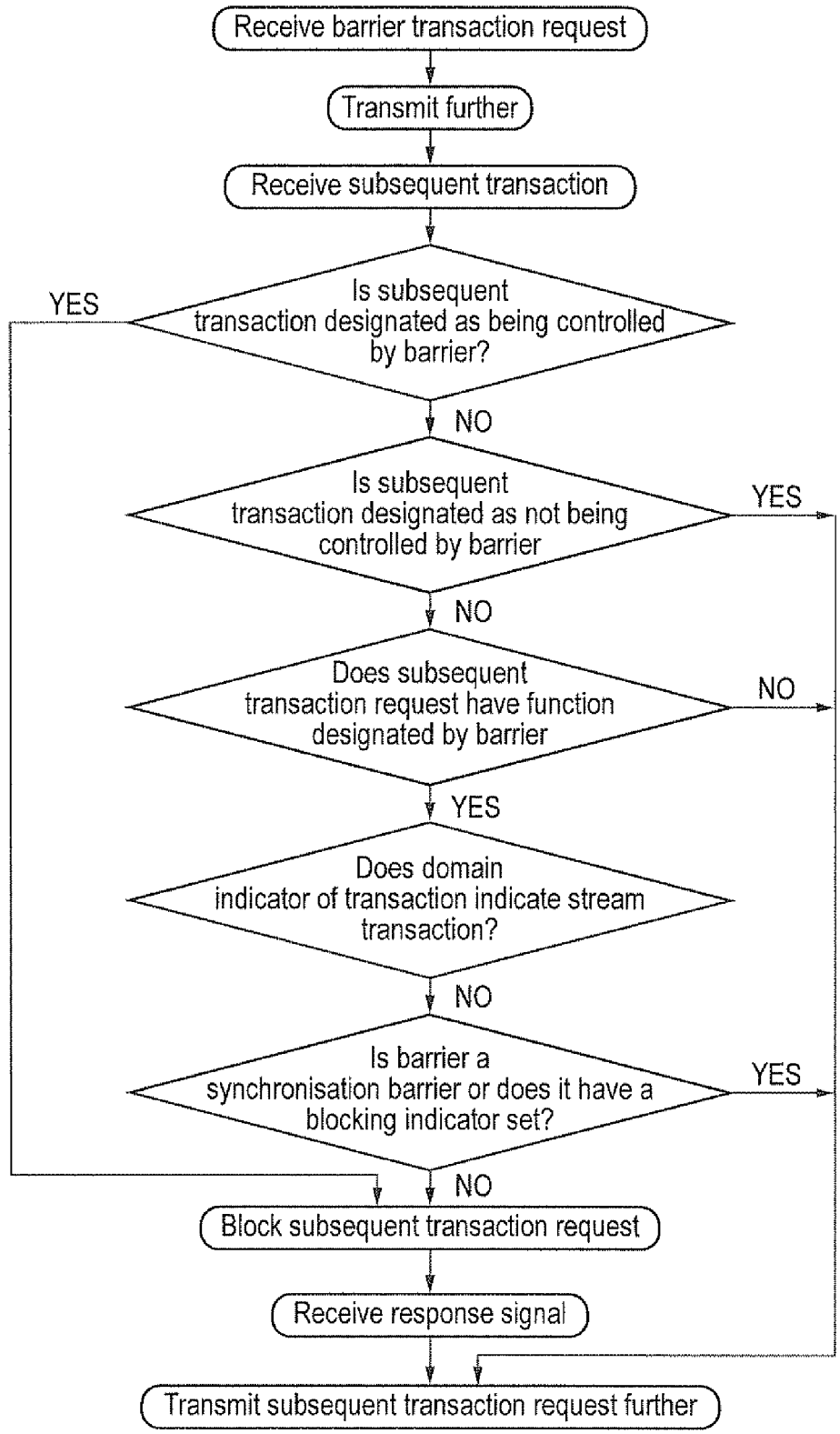
FIG. 17 shows a flow diagram illustrating steps in a method of processing barrier transactions at a blocking unit within an interconnect according to an embodiment of the present invention.

FIG. 17 is a flow diagram showing steps in a method of processing barriers at a blocking unit within the interconnect such as that shown in FIG. 1 that illustrates the different properties a barrier transaction can have.

Thus, following receipt of a barrier transaction if a subsequent transaction is designated as being controlled by that barrier then it is blocked until a response is received. If it is not so designated, then the other properties of the transaction are considered. If it is designated as not being controlled by the barrier, then it is transmitted further and not blocked. If it isn't it is determined if it has a function designated by the barrier. It should be noted the barrier may not designate a particular function, in which case the transactions are blocked irrespective of their function, however, if it does specify a function then transactions not performing this function are not blocked and are transmitted further. If the subsequent transaction indicates a domain, then it is determined if the domain indicator of the transaction is a stream indicator, if it is then the transaction is not blocked but if it is any other domain it is blocked. It is also determined if the barrier is a synchronisation barrier or if it has a blocking indicator. In either case the subsequent transactions will not be blocked by these barriers as subsequent transactions will have been blocked previously and thus, any subsequent transactions received will not be affected by these barriers.

It should be noted that although the steps are shown in a particular order, they can of course be performed in any order. Furthermore, where the barrier has no indicator of a particular function, initiator or domain, then these things do not need to be considered.

Figure 18:
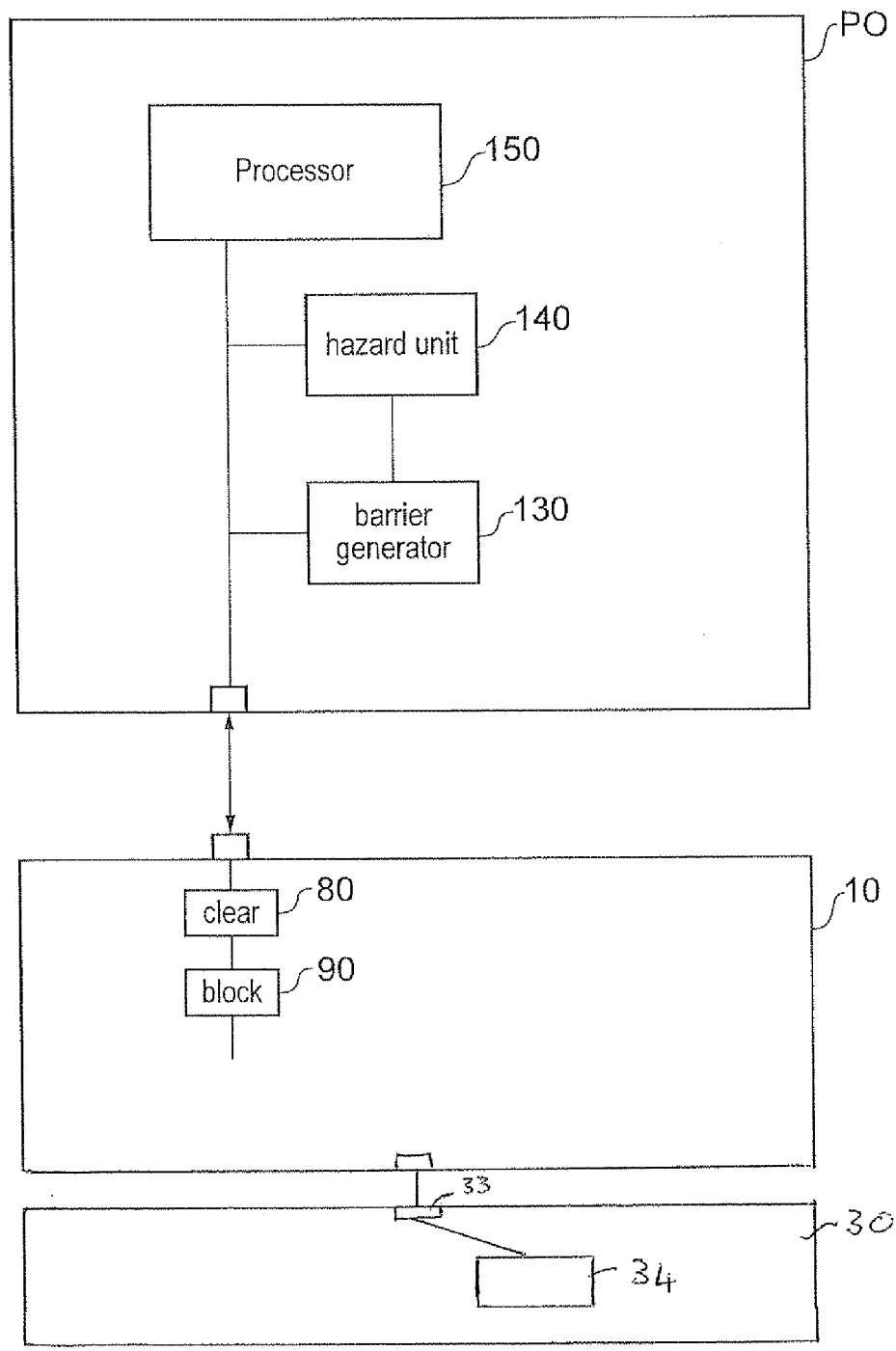
FIG. 18 shows an initiator device and a recipient device according to the present technique.

FIG. 18 shows an initiator device and a recipient device according to the present technique. This initiator device is a processor P0 which is connected to an interconnect 10 and then to recipient device 30. Interconnect 10 may have more recipient devices and initiator devices not shown connected to it In this embodiment it is the initiator device, P0 that generates the barriers using barrier generator 130. This barrier generator generates barrier transaction requests with at least one indicator. This indicator may be an indicator indicating the nature of the barrier transaction request, that is which transaction requests it controls or it may be an indicator indicating whether the transaction request is blocking or not or it may be both. If the indicator indicates that the barrier transaction request is a blocking request then initiator device P0 does not issue any further transaction requests subsequent to the barrier transaction request to the interconnect until a response signal to that barrier has been received.

Initiator device P0 also has a processor 150 and a hazard unit 140.

Memory hazards arise when transactions to the same address which have been issued by an agent, in the expectation that they will occur in a particular order, could be reordered with respect to each other. When they detect a hazard, masters must not issue the later transaction until it has seen completion (for a read) or buffered response (for a write) for the earlier transaction.

To permit the determination of a hazard, a master must have a transaction tracking mechanism that records transactions against which a hazard could occur. This is provided in the form of hazard unit 140, which stores the pending transactions against which a hazard could occur, until they are no longer hazards. Hazard unit 140 has a finite size that is advantageously quite small, thus, there is a risk that the hazard unit might become full. If this occurs then processor 150 needs to stall issuing transactions until one of the transactions stored in the hazard unit has completed and can be deleted from the hazard unit. If pending transactions that should be stored in the hazard unit are not stored then a hazard can occur which cannot be corrected. This is not allowed. Clearly stalling in this way is costly in increased latency.

Hazards are removed when the transaction has completed without the hazard occurring. However, if a hazard were to be protected against by issuing a barrier, the earlier transaction may be removed from the hazard unit 150 as it is no longer vulnerable to any subsequent hazarding transaction. Thus, embodiments of the present invention address this latency problem by using barrier generator 130. Barrier generator 130 can detect when hazard unit 140 is full and in response to detecting this can issue a barrier transaction. This barrier transaction will stop subsequent transactions from being re-ordered with respect to it and thus, can remove potential hazards of the transactions stored in the hazard unit which can then be evicted from the hazard unit. Thus, if the barrier generator generates a global barrier which no transactions can be re-ordered with respect to, then hazard until 140 can be flushed. However, a global barrier will itself generate latency in the interconnect and may not be desirable.

Thus, in some embodiments it may be more advantageous to generate an addressed barrier that corresponds to an address of a transaction within the hazard unit. Generally the most recent transaction in the hazard unit is selected as it is likely that this will be the last one to be evicted during normal operation. Thus, the barrier generator 130 detects the address of the most recent transaction in the hazard unit and issues a barrier related to this address such that any transactions to that address are not allowed to be re-ordered with respect to that barrier. This ensures that this addressed transaction is no longer a possible hazard and it can be evicted from the hazard unit. This frees up a space and allows processor 150 to continue issuing transactions.

Barrier generator 130 can also be used to generate barriers in other circumstances. For example, it may detect strongly ordered transactions that are issued by the processor which must be completed in a certain order. Generally when a strongly ordered transaction is output, P0 does not output any further transactions until it has a response signal from the strongly ordered transaction indicating that it has completed. This of course affects the latency of processor P0. In some embodiments, barrier generator 130 detects the processor 150 issuing a strongly ordered transaction and itself issues a barrier. Once the barrier has been output to the interconnect 10 response unit 80 within the interconnect sends a response signal to the processor P0 which clears the barrier and allows processor P0 to output further transactions. In order to avoid problems due to re-ordering with respect to the strongly ordered transaction blocking unit 90 blocks subsequent transactions. Interconnect 10 deals with the barrier as it passes through the interconnect, blocking and clearing as appropriate and processor P0 can continue to issue transactions. As the interconnect is designed to deal with barriers to reduce latency where possible, the latency of the system can be reduced as compared to a block occurring at processor P0 until the strongly ordered transaction has completed.

Recipient device has a port 33 for receiving transaction requests from the initiator device P0 via interconnect 10 and in response to receipt of a blocking barrier transaction request, response signal generator 34 issues a response and transmits it to interconnect 10 via port 33. In response to the barrier transaction request being a non-blocking transaction request, recipient device 30 may not issue any response. Furthermore, the recipient device may be responsive to some indicators on the barrier transaction request to delay generating and/or transmitting said response signal until processing of previously received transaction requests has at least partially completed. It may be that certain barrier transaction requests require not only that the earlier transaction requests have reached their final destination but also that they have completed processing, this is the case for example with a data synchronisation barrier. Thus, in response to the recipient device recognising such a barrier perhaps from indicator values within the barrier transaction request, the recipient device may delay the transmission of the response signal until the require processing has completed.

Figure 19:
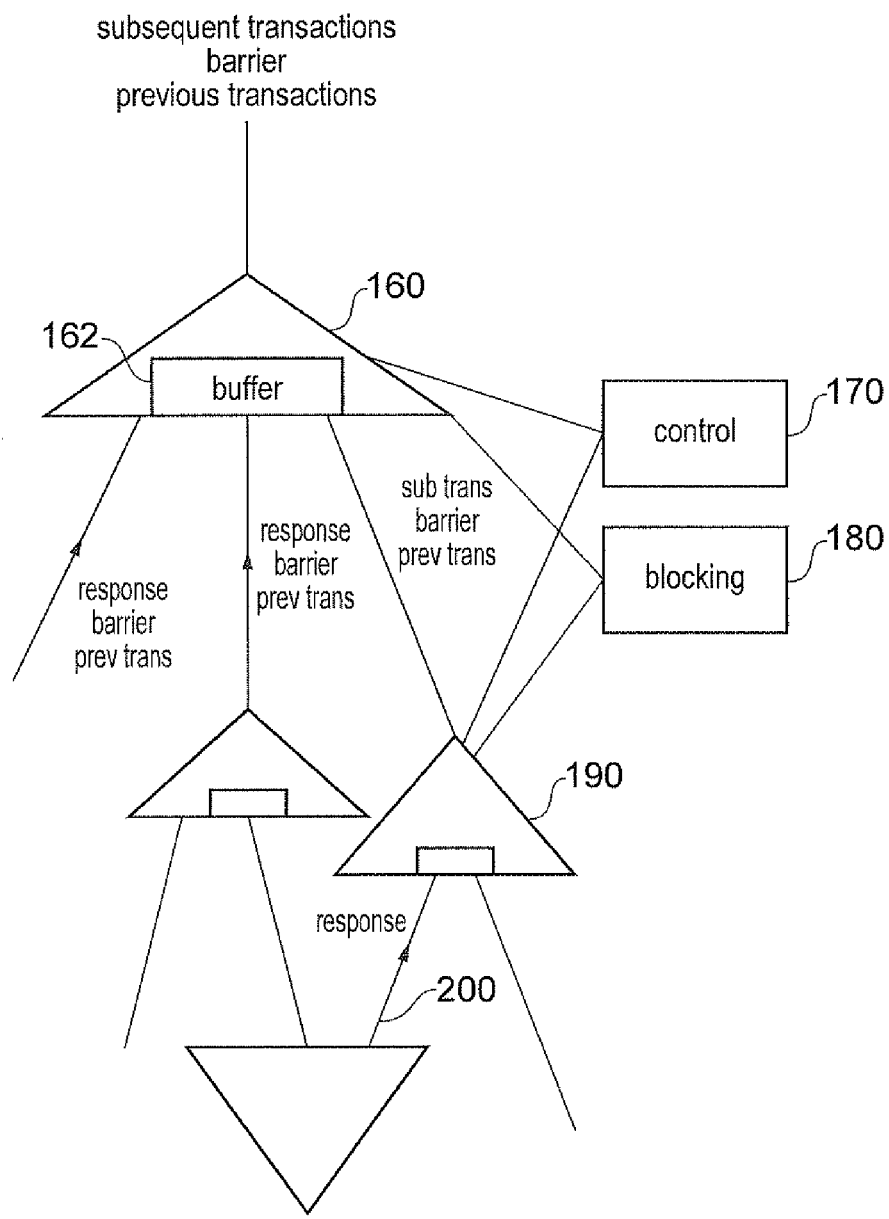
FIG. 19, schematically shows transmission and blocking of transactions.

FIG. 19 shows diagrammatically blocking and responding to transactions in a cross coupled, reconvergent region. A transaction stream having a barrier within it arrives at divergent point 160. Divergent point 160 has control circuitry 170 and barrier management circuitry 180 associated with it. It also has buffer 162 for storing transactions.

Barrier management circuitry 180 duplicates the barrier and sends the duplicated barriers down each of the exit paths. Control circuitry 170 acts to block the subsequent transactions from progressing further and monitors for response signals to the duplicated barrier transactions. In response to receiving two responses, the control circuitry in this embodiment unblocks the path that no response has yet been received on and allows the subsequent transactions to proceed down this path. As they are only allowed down this one path they cannot overtake the barrier and the previous transactions on this path, and the barriers on the other paths have been responded to, so there is no danger of reordering with respect to those transactions. Unblocking this path early is particularly advantageous as this may well be the path with the most traffic, as it is the slowest to respond and thus, sending subsequent transactions as soon as possible down this path helps reduce latency.

Before sending the subsequent transactions, a barrier representation may also be sent down this path. This is required where there may be further splitting of the paths as in this case.

At the next point of divergence 190, receipt of the barrier results in a response signal being sent and the other paths being cleared, while receipt of the barrier representation results in the barrier management circuitry 180 duplicating the barrier and sending it down each of the exit paths while the control circuitry 170 acts to stall the subsequent transactions. In response to receipt of a response signal on one of the paths the other path can be unblocked as the only path no response has been received on and subsequent transactions sent further along with a barrier representation. When a response has been received on both paths then both paths are unblocked.

It should be noted that the barrier representation is never duplicated and does not require a response. It just allows the control circuitry to understand that the transactions subsequent to it were transmitted prior to a response being received and thus, if there is a subsequent point of divergence for example, blocking may be required.

This is a convenient way of improving the efficiency of dealing with barriers. Furthermore, in some examples it may be particularly advantageous if, path 200 shown in FIG. 19 happened to be a path with little traffic where perhaps the previous transaction was a barrier for which a response has been received, then on this duplication of the barriers at the point of divergence 190 barrier management circuitry will be aware that the previous transaction down path 200 was a barrier and that a response signal has been received for it and it can delete the duplicated barrier and respond and in this case, it can immediately open the other path and send the subsequent transactions to it, thereby reducing the latency of the system still further.

FIG. 20 shows a summary of the different sorts of barrier transactions and how they can be converted from one type to another as they enter different regions of the interconnect that have different requirements. In this way the latency introduced by a barrier can be reduced by removing its blocking nature where possible and reintroducing it as required.

The memory barrier transactions can be blocking or not depending on where they are in the interconnect. In effect there are three different behaviours of these barriers, and these can be thought of as three different types of memory barrier. There is an order barrier which does not block but stays in the transaction stream separating the subsequent transactions from the earlier ones, in an interconnect having domains a memory barrier outside of its domain acts as an order barrier, a system flush barrier which does block deliberately and corresponds to a DSB, and a local flush barrier which generally does not block but will do so locally for necessary topological reasons (in a cross coupled region) or optional performance reasons.

Conversion between these types is possible in many cases. Conversion from an order barrier to a system or local flush barrier requires that the conversion point block subsequent transactions. Conversion from a system or local flush barrier to an order barrier does not require that an early response is given (to cause subsequent transactions to be sent), but one may be provided—such conversion without sending an early response is pointless as it would not reduce the latency for the barrier issuer and would cause more masters to be blocked at the next cross coupled region. If an early response is required (and permitted—i.e. in a bisection region) then if it is in response to a system or local flush barrier then as the early response could cause transactions from behind the barrier to be sent, either the location providing the response must block these later transactions or it must change the barrier so that it is an order barrier.

In general it is anticipated that optional conversion will be infrequent as the nature of the transaction is useful to honor for performance management and Quality of Service reasons—the blocking nature of the barrier at issue can be used to trade-off the latency that the barrier's blocking nature adds to the issuer and to other masters.

FIG. 20 shows the permitted blocking conversions according to the context they occur in and what blocking is required for the conversions.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Interconnect circuitry for a data processing apparatus, said interconnect circuitry being configured to provide data routes via which at least one initiator device may access at least one recipient device, said interconnect circuitry comprising:
    at least one input for receiving transaction requests from said at least one initiator device;
    at least one output for outputting transaction requests to said at least one recipient device;
    at least one path for transmitting said transaction requests between said at least one input and said at least one output;
    control circuitry for routing said received transaction requests from said at least one input to said at least one output; wherein:

said control circuitry, in response to a barrier transaction request to maintain an ordering of at least some transaction requests with respect to said barrier transaction request within a stream of transaction requests passing along one of said at least one paths, is configured to not allow reordering of at least some transaction requests that occur before said barrier transaction request in said stream of transaction requests with respect to at least some transaction requests that occur after said barrier transaction request in said stream of transaction requests and to delay transmission along said at least one path of said at least some transaction requests while allowing other transaction requests to proceed, said barrier transaction request comprises an indicator indicating which of said transaction requests within said stream of transaction requests comprise said at least some transaction requests whose ordering is to be maintained, said indicator is indicative of a property of said transaction requests, and said at least some transaction requests comprise transaction requests having said property, and said indicator indicates a function of said transaction request.

2. Interconnect circuitry according to claim 1, wherein said control circuitry is configured to respond to a barrier transaction request to maintain an ordering of at least some transaction requests with respect to said barrier transaction request, by delaying transmission along said path of said at least some transaction requests that occur subsequent to said barrier transaction request in said stream of transaction requests until receipt of a response signal clearing said barrier transaction.

3. Interconnect circuitry according to claim 1, wherein said property comprises a source of said transaction request.

4. Interconnect circuitry according to claim 1, wherein said indicator indicates one or more addresses, said at least some transaction requests comprising transaction requests to said one or more addresses.

5. Interconnect circuitry according to claim 2, said interconnect circuitry comprising a plurality of domains, each domain comprising at least one input for receiving transaction requests from an initiator device, wherein said indicator comprises a domain indicator indicating whether said at least some subsequent transaction requests received from all initiator devices should be delayed, or only those received from initiator devices from one of said domains or whether no transaction requests should be delayed.

6. Interconnect circuitry according to claim 1, wherein said barrier transaction request comprises an indicator indicating a domain said barrier transaction request applies to and said control circuitry is configured to determine if a received transaction request is subject to said barrier transaction request by determining if an issuer of said received transaction request belongs to said domain indicated by said barrier.

7. Interconnect circuitry according to claim 1, said interconnect circuitry further comprising barrier management circuitry.

8. Interconnect circuitry according to claim 7, wherein said control circuitry is configured to duplicate barrier transactions at a divergent node at an entry to a reconvergent region and to provide said duplicated barrier transactions with a reconvergent indicator; and said barrier management circuitry is responsive to detecting said duplicated barrier transactions exiting said reconvergent region to remove said reconvergent indicator and to merge at least some of said duplicated barrier transactions.

9. Interconnect circuitry according to claim 8, wherein said control circuitry is further configured to provide said duplicated barrier with an indication of a number of said duplicated barrier transactions, to indicate to said barrier management circuitry a number of barrier transactions that can be merged.

10. Interconnect circuitry according to claim 7, wherein said barrier management circuitry is configured to respond to detection of neighbouring barrier transaction requests in said stream of transaction requests having a same indicator to merge said neighbouring barrier transaction requests and to provide said merged barrier transaction request with said same indicator.

11. Interconnect circuitry according to claim 7, wherein said barrier management circuitry is configured to merge barrier transaction requests with a different indicator and to provide said merged barrier transaction request with an indicator indicating transactions indicated by each of said indicators of said merged barrier transaction requests.

12. Interconnect circuitry according to claim 7, wherein said barrier management circuitry is configured in response to detecting a barrier transaction request following a previous barrier transaction request with no intervening transaction requests that have their ordering controlled by said following barrier transaction request, to:

reorder said transaction requests such that said following barrier transaction is moved adjacent to said previous barrier transaction request; and to merge said adjacent barrier transaction requests.

13. Interconnect circuitry according to claim 7, comprising barrier management circuitry configured in response to detecting a barrier transaction request following a previous barrier transaction request with no intervening transaction requests that have their ordering controlled by said previous barrier transaction request, to:

reorder said transaction requests such that said previous barrier transaction is moved adjacent to said following barrier transaction request; and to merge said adjacent barrier transaction requests.

14. Interconnect circuitry according to claim 7, wherein said barrier management circuitry is configured in response to detecting a barrier transaction between two or more transactions that are transactions that can be merged, to duplicate said barrier transaction and put one of said duplicated barrier transactions on either side of said two or more transactions and to merge said two or more transactions.

15. Interconnect circuitry according to claim 12, wherein said barrier management circuitry is configured to detect said barrier transaction requests within a reorder buffer or at a node within said interconnect circuitry, said node comprising an entry node to a bisection path, said bisection path being an only communication path between said entry node and an exit node of said bisection path in said interconnect circuitry.

16. Interconnect circuitry according to claim 1, wherein said control circuitry is configured to mark transaction requests that are not subject to any barrier transactions, said at least some transaction requests not comprising said marked transaction requests.

17. An initiator device for issuing transaction requests to at least one recipient device via an interconnect, comprising:

a barrier transaction request generator for generating barrier transaction requests indicating to said interconnect that an ordering of at least some transaction requests within a stream of transaction requests passing through said interconnect should be maintained by not allowing reordering of at least some of said transaction requests that occur before said barrier transaction request in said stream of transaction requests with respect to at least some of said transaction requests that occur after said barrier transaction request; wherein said barrier transaction request generator is configured to provide said generated barrier transaction requests with an indicator indicating which of said transaction requests within said stream of transaction requests comprise said at least some transaction requests whose ordering is to be maintained, said indicator indicating at least one of:

a source of said transaction request;

a function of said transaction request; and a domain indicator indicating that transaction requests from initiator devices from a domain indicated by said domain indicator should be delayed, wherein said barrier transaction generator is configured in response to detection of output of a strongly ordered transaction request to generate and output a barrier transaction.

18. An initiator device according to claim 17, said initiator device further comprising:

a hazard unit for storing outstanding transaction requests that may generate a hazard; and an output for outputting said transaction requests to said interconnect; wherein said initiator device is configured in response to detecting said hazard unit being full such that output of further transaction requests is stalled, to generate and output a barrier transaction request relating to at least one address and to flush said hazard unit of any transaction requests relating to said at least one address.

19. An initiator device according to claim 18, wherein said barrier transaction request is a global barrier transaction request relating to all transaction requests, and said initiator device is configured to flush said hazard unit of all transaction requests.

20. An initiator device according to claim 19, wherein said barrier transaction request relates to an address of one of said transaction requests that is recently stored in said hazard unit, and said hazard unit is configured to flush said recently stored transaction request from said hazard unit.

21. A data processing apparatus comprising at least one initiator device according to claim 17 for issuing transaction requests, at least one recipient device for receiving said transaction requests and an interconnect according to claim 1, for connecting said at least one initiator device to said at least one recipient device.

22. A method for routing data from at least one initiator device to at least one recipient device via interconnect circuitry, said method comprising:

receiving transaction requests from said at least one initiator device at at least one input;

transmitting said transaction requests along at least one of a plurality of paths towards at least one output;

in response to receipt of a barrier transaction request:

maintaining an ordering of at least some transaction requests with respect to said barrier transaction request within a stream of transaction requests passing along one of said paths said barrier transaction request, by not allowing reordering of at least some transactions requests that occur before said barrier transaction request in said stream of transaction requests with respect to at least some transaction requests that occur after said barrier transaction request in said stream of transaction requests, and by delaying transmission along said at least one path of said at least some transaction requests while allowing other transaction requests to proceed; wherein:

said barrier transaction comprises an indicator indicating which of said transaction requests within said stream of transaction requests comprise said at least some transaction requests whose ordering is to be maintained, said indicator is indicative of a property of said transaction requests, and said at least some transaction requests comprise transaction requests having said property, and said indicator indicates a function of said transaction request.

* * * * *